US010953256B2

(12) United States Patent
Ni et al.

(10) Patent No.: US 10,953,256 B2
(45) Date of Patent: Mar. 23, 2021

(54) COMPOSITION COMPRISING FLUORINE-CONTAINING KETONE

(71) Applicants: Sinochem Lantian Co., Ltd, Hangzhou (CN); ZHEJIANG RESEARCH INSTITUTE OF CHEMICAL INDUSTRY CO., LTD, Hangzhou (CN)

(72) Inventors: Hang Ni, Zhejiang (CN); Xia Luo, Zhejiang (CN)

(73) Assignees: Sinochem Lantian Co., Ltd, Hangzhou (CN); ZHEJIANG RESEARCH INSTITUTE OF CHEMICAL INDUSTRY CO., LTD, Hangzhou (CN)

( * ) Notice: Subject to any disclaimer, the term of this patent is extended or adjusted under 35 U.S.C. 154(b) by 146 days.

(21) Appl. No.: 15/923,870

(22) Filed: Mar. 16, 2018

(65) Prior Publication Data

US 2018/0200553 A1 Jul. 19, 2018

Related U.S. Application Data

(63) Continuation of application No. PCT/CN2017/074814, filed on Feb. 24, 2017.

(30) Foreign Application Priority Data

Feb. 26, 2016 (CN) .......................... 201610108788.7

(51) Int. Cl.
*A62D 1/00* (2006.01)
*C09K 5/00* (2006.01)

(52) U.S. Cl.
CPC .......... *A62D 1/0028* (2013.01); *A62D 1/0092* (2013.01); *C09K 5/00* (2013.01)

(58) Field of Classification Search
CPC .................................................. A62D 1/0028
See application file for complete search history.

(56) References Cited

U.S. PATENT DOCUMENTS

| | | | |
|---|---|---|---|
| 6,478,979 | B1 | 11/2002 | Rivers et al. |
| 2003/0019841 | A1 | 1/2003 | Kesari et al. |
| 2005/0023007 | A1 | 2/2005 | Nappa et al. |
| 2005/0033095 | A1 | 2/2005 | Nappa et al. |
| 2008/0224091 | A1 | 9/2008 | Minor et al. |
| 2012/0145521 | A1 | 6/2012 | Glasmacher |
| 2013/0146316 | A1 | 6/2013 | Griffith |
| 2013/0269958 | A1* | 10/2013 | Zhang ...................... A62D 1/00 169/47 |
| 2014/0248706 | A1* | 9/2014 | Tsuchiya ............ G01N 33/2876 436/101 |
| 2014/0311146 | A1 | 10/2014 | Fayemi et al. |

FOREIGN PATENT DOCUMENTS

| | | |
|---|---|---|
| CN | 1809324 A | 7/2006 |
| CN | 103269755 A | 8/2013 |
| CN | 104449580 A | 3/2015 |
| CN | 104871280 A | 8/2015 |
| CN | 104900446 A | 9/2015 |
| JP | H11-080791 A | 3/1999 |
| JP | 2004-536448 A | 12/2004 |
| JP | 2007-515989 A | 6/2007 |
| JP | 2012-530483 A | 11/2012 |
| JP | 2014-507203 A | 3/2014 |
| JP | 2014-534840 A | 12/2014 |
| JP | 2015-172204 A | 10/2015 |
| KR | 10-0739239 B1 | 7/2007 |
| WO | 2014/198593 A1 | 12/2014 |

OTHER PUBLICATIONS

Xie et al. English machine translation of CN104449580A (Year: 2015).*
Office Action issued in corresponding Japanese Application No. 2018-515114 dated Jan. 22, 2019, and English translation thereof (11 pages).
International Search Report issued in corresponding International Application No. PCT/CN2017/074814 with English translation dated May 24, 2017 (9 pages).
Written Opinion issued in corresponding International Application No. PCT/CN2017/074814 dated May 24, 2017 (4 pages).
Office Action issued in corresponding Japanese Application No. 2018-515114 dated Nov. 12, 2019, and English translation thereof (9 pages).

* cited by examiner

*Primary Examiner* — Peter F Godenschwager
(74) *Attorney, Agent, or Firm* — Osha Bergman Watanabe & Burton LLP

(57) ABSTRACT

Disclosed is a composition comprising: (A) at least one fluorine-containing ketone; and (B) an effective amount of stabilizer which is selected from at least one of the group consisting of an epoxy compound, a nitro compound, a hindered phenolic compound, a β-diketone compound, a phosphite compound, a salicylate compound, a cinnamate compound, a hydroxybenzophenone compound, a hydroxybenzoic acid compound, an alkoxy methane compound, and an organic thio compound. The composition provided by the present invention has stable performance, and can be used as a fire extinguishing agent, a heat transfer medium, etc.

15 Claims, No Drawings

COMPOSITION COMPRISING FLUORINE-CONTAINING KETONE

BACKGROUND

Technical Field

The present invention relates to a composition comprising fluorine-containing ketone.

Background Art

Fluorine-containing ketone compounds are promising to replace existing HCFCs and HFCs in many fields such as fire extinguishing, refrigeration, foaming and cleaning because they do not damage the ozone layer (ODP=0) and have a low greenhouse effect (GWP<150).

Fluorine-containing ketone compounds, being alone or mixed, may be used as a working fluid. However, fluorine-containing ketone compounds are unstable under extreme conditions. For example, when exposed to air, in contact with moisture, oxygen, or other compounds with which fluorine-containing ketone compounds may react, they may easily degrade or decompose and such degradation or decomposition may be accelerated under the presence of natural light, ultraviolet light or metal. Fluorine-containing ketone compounds, when used as a working fluid in refrigeration equipment or other similar applications, may also be unstable under extreme conditions, especially at elevated temperatures. This degradation or decomposition may be attributed to different situations, in some cases to instability of fluorine-containing ketone compounds under extreme working conditions, and in other cases to unintentional leakage into the air. No matter what situations lead to the degradation or decomposition, there is increased difficulty in application of fluorine-containing ketone compounds.

In order to explore the stability of fluorine-containing ketone compounds, the stability of alkanes, alkenes and ketones is compared based on the structure of the compounds. Propane, propylene and acetone, for example, has a pKa of 45, 43 and 26.5, respectively. Propane is very stable. Propylene is almost as stable as propane. Because acetone contains a carbonyl group, which may easily bond to protons, rendering the entire acetone molecule electrically positive, thus the acidity is enhanced and the stability is not as good as propane and propylene. Further take 1-bromopropene, 3-bromopropene and bromoacetone as an example. 1-bromopropane is easy to generate HBr after heating. 3-bromopropene is easy to leave bromine free radical to generate allyl free radical. Bromoacetone is very unstable; the liquid color thereof will turn from colorless to purple after a while, and after being placed in the air for a long time, it will become a black resinous material.

In summary, in order to take advantage of many beneficial properties of fluorine-containing ketone compounds, there is a need to find a way to reduce their degradation or decomposition.

SUMMARY

To avoid the possible instability of fluorine-containing ketone under extreme conditions, it has been found that the addition of a specific compound, which is at least one selected from the group consisting of an epoxy compound, a nitro compound, a hindered phenolic compound, a β-diketone compound, a phosphite compound, a salicylate compound, a cinnamate compound, a hydroxybenzophenone compound, a hydroxybenzoic acid compound, an alkoxymethane compound and an organic thio compound, can improve their stability.

Therefore, according to the present invention, a composition is provided, comprising: (A) at least one fluorine-containing ketone; and B) an effective amount of a stabilizer, which is at least one selected from the group consisting of an epoxy compound, a nitro compound, a hindered phenol compound, a β-diketone compound, a phosphite compound, a salicylate compound, a cinnamate compound, a hydroxybenzophenone compound, a hydroxybenzoic acid compound, an alkoxymethane compound and an organic thio compound.

A method of stabilizing a composition comprising at least one fluorine-containing ketone is also provided, said method comprising adding an effective amount of a compound stabilizer, comprising at least one of an epoxy compound, a nitro compound, a hindered phenolic compound, a β-diketone compound, a phosphite compound, a salicylate compound, a cinnamate compound, a hydroxybenzophenone compound, a hydroxybenzoic acid compound, an alkoxymethane compound or an organic thio compound, to a composition comprising at least one fluorine-containing ketone.

A method of reducing degradation of a composition comprising at least one fluorine-containing ketone is also provided, the degradation resulting from the presence of moisture in a fire extinguishing, washing, refrigeration, air conditioning or heat pump system, and the method comprises adding an effective amount of a compound stabilizer, comprising at least one of a hindered phenol compound, a β-diketone compound, a phosphite compound, a hydroxybenzophenone compound or an alkoxymethane compound, to a composition comprising at least one fluorine-containing ketone.

A method of reducing degradation of a composition comprising at least one fluorine-containing ketone is also provided, the degradation resulting from the presence of moisture and metals in a fire extinguishing, washing, refrigeration, air conditioning or heat pump system, and the method comprises adding an effective amount of a compound stabilizer, comprising at least one of a hindered phenol compound, a β-diketone compound, a phosphite compound, a hydroxybenzophenone compound, an alkoxymethane compound or an organic thio compound, to a composition comprising at least one fluorine-containing ketone.

A method of reducing degradation of a composition comprising at least one fluorine-containing ketone is also provided, the degradation resulting from the presence of moisture, metals and acids in a fire extinguishing, washing, refrigeration, air conditioning or heat pump system, and the method comprises adding an effective amount of a compound stabilizer, comprising at least one of a nitro compound, a hindered phenol compound, a β-diketone compound, a phosphite compound, a salicylate compound, a cinnamate compound, a hydroxybenzophenone compound, a hydroxybenzoic acid compound, an alkoxymethane compound or an organic thio compound, to a composition comprising at least one fluorine-containing ketone.

A method of reducing degradation of a composition comprising at least one fluorine-containing ketone under moisture and light is also provided, said method comprising adding an effective amount of a compound stabilizer, comprising least one of a hindered phenolic compound, a β-diketone compound, a phosphite compound, a salicylate compound, a cinnamate compound, a hydroxybenzophenone compound, a hydroxybenzoic acid compound or an alkoxymethane compound, to a composition comprising at least one fluorine-containing ketone.

A method of reducing reaction between oxygen and a composition comprising at least one fluorine-containing ketone is also provided, said method comprising adding an effective amount of a compound stabilizer, comprising at least one of an epoxy compound, a nitro compound, a hindered phenolic compound, a β-diketone compound, a phosphite compound, a salicylate compound, a cinnamate compound, a hydroxybenzophenone compound, a hydroxybenzoic acid compound or an alkoxymethane compound, to a composition comprising at least one fluorine-containing ketone.

A method of suppressing a flame is also provided, the method comprising applying at least a composition to at least a portion of the flame or to a fuel source of the flame, the composition comprising at least one fluorine-containing ketone and an effective amount of a stabilizer, the stabilizer comprising at least one of an epoxy compound, a nitro compound, a hindered phenol compound, a β-diketone compound, a phosphite compound, a salicylate compound, a cinnamate compound, a hydroxybenzophenone compound, a hydroxybenzoic acid compound, an alkoxymethane compound or an organic thio compound.

A method of extinguishing a fire is also provided, the method comprising applying at least a composition to prevent ignition or deflagration of combustible materials in a hermetically sealed space containing air, the composition comprising at least one fluorine-containing ketone and an effective amount of a stabilizer comprising at least one of an epoxy compound, a nitro compound, a hindered phenol compound, a β-diketone compound, a phosphite compound, a salicylate compound, a cinnamate compound, a hydroxybenzophenone compound, a hydroxybenzoic acid compound, an alkoxymethane compound or an organic thio compound.

Applications of the composition are also provided. The composition may be used as a fire extinguishing agent, heat transfer medium, magnesium alloy melt protective agent, solvent, cleaning agent, blowing agent, aerosol propellant, insulating medium or electron etching gas,

DETAILED DESCRIPTION

The present invention provides a composition, comprising: (A) at least one fluorine-containing ketone; and (B) an effective amount of a stabilizer, which is at least one selected from the group consisting of an epoxy compound, a nitro compound, a hindered phenol compound, a β-diketone compound, a phosphite compound, a salicylate compound, a cinnamate compound, a hydroxybenzophenone compound, a hydroxybenzoic acid compound, an alkoxymethane compound and an organic thio compound.

These compositions have a variety of uses, and may be used as, for example, a fire extinguishing agent, heat transfer medium, magnesium alloy melt protective agent, solvent, cleaning agent, blowing agent, aerosol propellant, insulating medium or electron etching gas. When the composition is used as a fire extinguishing agent, it may be used in, for example, a pipe network tire extinguishing system, a cabinet fire extinguishing system, a hanging fire extinguishing system, a fire detection tube fire extinguishing system or a portable fire extinguisher. When used as a heat transfer medium, the composition may be used in, for example, a refrigerator, a cooler, an organic rankine cycle device, a heat pump, or a container.

Fire extinguishing agent, also referred to as flame inhibitor, is a volatile composition that extinguishes or inhibits flames.

Heat transfer medium, also referred to as heat transfer fluid, heat transfer composition, or heat transfer fluid composition, is a working fluid used to transfer heat from a heat source to a heat sink.

A blowing agent is a volatile composition that expands a polymer matrix to form a porous structure.

A solvent is a fluid that removes dirt from a substrate or deposits a material onto a substrate or a support material.

Aerosol propellant is a volatile composition of single or multiple components, that applies a pressure greater than one atmosphere to push a material out of a container.

As used herein, the term fluorine-containing ketone means a compound containing carbon atoms, fluorine atoms, and optionally hydrogen atoms and having carbonyl groups in the molecular structure. In one embodiment, the fluorine-containing ketone used in the present invention have the following molecular structure:

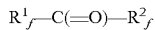

$$R^1_f\text{—}C(=O)\text{—}R^2_f$$

wherein, $R^1_f$ and $R^2_f$ are independently selected from $C_aH_bF_cCl_dBr_e$, wherein a is an integer selected from 1 to 7, b, d and e are independent integers selected from 0 to 15, c is an integer selected from 1 to 15, and $b+c+d+e \leq 2a+1$.

In another embodiment, the fluorine-containing ketone is at least one of the following compounds: $CF_3C(=O)CF_3$, $CF_3C(=O)CF_2CF_3$, $CF_3C(=O)CF_2CF_2CF_3$, $CF_3C(=O)CF(CF_3)_2$, $CF_3C(=O)CF_2CF_2CF_2CF_3$, $CF_3C(=O)CF_2CF(CF_3)_2$, $CF_3C(=O)CF(CF_3)CF_2CF_3$, $CF_3C(=O)CF_2CF_2CF_2CF_2CF_3$, $CF_3C(=O)CF(CF_3)CF_2CF_2CF_3$, $CF_3C(=O)CF(CF_2CF_3)_2$, $CF_3C(=O)CF_2CF_2CF_2CF_2CF_3$, $CF_3C(=O)CF(CF_3)CF_2CF_2CF_3$, $CF_3C(=O)CF(CF_2CF_3)CF_2CF_2CF_3$, $CF_3C(=O)C(CF_3)_2CF_2CF_2CF_3$, $CF_3C(=O)CF_2CF(CF_3)CF_2CF_3$, $CF_3C(=O)CF(i\text{—}C_3F_7)CF_2CF_3$, $CF_3C(=O)CF(CF_3)CF_2CF(CF_3)_2$, $CF_3C(=O)CF_2CF_2CF_2CF_2CF_2CF_3$, $CF_3C(=O)CF(CF_3)CF_2CF_2CF_2CF_3$, $CF_3C(=O)CF_2CF_2CF=CF_2$, $CF_3C(=O)CF(CF_3)CF=CF_2$, $CF_3C(=O)CH(CF_3)CHFCF_3$, $CF_3C(=O)CH_2CFBrCF_3$, $CF_3C(=O)CBr(CF_3)CH_2F$, $CF_3C(=O)CHBrCHFCF_3$, $CF_3C(=O)CH(CF_3)CHFBr$, $CF_3(=O)CH_2CFClCF_3$, $CF_3C(=O)CCl(CF_3)CH_2F$, $CF_3C(=O)CHClCHFCF_3$, $CF_3C(=O)CH(CF_3)CHFCl$, $CF_3(=O)CH_2CHFCF_3$, $CF_3C(=O)CH(CF_3)CH_2F$, $CF_3C(=O)CH_2CF_2CF_3$, $CF_3C(=O)CF(CF_3)CH_2F$, $CF_3C(=O)CHFCHFCF_3$, $CF_3C(=O)CH(CF_3)CHF_2$, $CF_3C(=O)CHFCF_3$, $CF_3C(=O)CF_2CHF_2$, $CF_3C(=O)CClFCF_3$, $CF_3C(=O)CF_2CF_2Cl$, $CF_3C(=O)CBrFCF_3$, $CF_3C(=O)CF_2CF_2Br$, $CF_3CF_2C(=O)CF_2CF_3$, $CF_3CF_2C(=O)CF_2CF_2CF_3$, $CF_3CF_2C(=O)CF(CF_3)_2$, $CF_3CF_2C(=O)CF_2CF_2CF_2CF_3$, $CF_3CF_2C(=O)CF_2CF(CF_3)_2$, $CF_3CF_2C(=O)CF(CF_3)CF_2CF_3$, $CF_3CF_2C(=O)CF_2CF_2CF_2CF_2CF_3$, $CF_3CF_2C(=O)CF(CF_3)CF_2CF_2CF_3$, $CF_3CF_2C(=O)CF(CF_2CF_3)_2$, $CF_3CF_2C(=O)CF_2CF_2CF_2CF_2CF_3$, $CF_3CF_2C(=O)CF(CF_3)CF_2CF_2CF_3$, $CF_3CF_2C(=O)CF(CF_2CF_3)CF_2CF_2CF_3$, $CF_3CF_2C(=O)C(CF_3)_2CF_2CF_2CF_3$, $CF_3CF_2C(=O)CF_2CF(CF_3)CF_2CF_2CF_3$, $CF_3CF_2C(=O)CF(i\text{—}C_3F_7)CF_2CF_3$, $CF_3CF_2C(=O)CF(CF_3)CF_2CF(CF_3)_2$, $CF_3CF_2C(=O)CF_2CF_2CF_2CF_2CF_2CF_3$, $CF_3CF_2C(=O)CF(CF_3)CF_2CF_2CF_2CF_3$, $CF_3CF_2C(=O)CF_2CF_2CF=CF_2$, $CF_3CF_2C(=O)CF(CF_3)CF=CF_2$, $CF_3CF_2C(=O)CH(CF_3)CHFCF_3$, $CF_3CF_2C(=O)CH_2CFBrCF_3$, $CF_3CF_2C(=O)CBr(CF_3)CH_2F$, $CF_3CF_2C(=O)CHBrCHFCF_3$, $CF_3CF_2C(=O)CH(CF_3)CHFBr$, $CF_3CF_2C(=O)$ CH$_2$CFClCF$_3$, CF$_3$CF$_2$C(=O)CCl(CF$_3$)CH$_2$F, CF$_3$CF$_2$C(=O)CHClCHFCF$_3$, CF$_3$CF$_2$C(=O)CH(CF$_3$)CHFCl, CF$_3$CF$_2$C(=O)CH$_2$CHFCF$_3$, CF$_3$CF$_2$C(=O)CH(CF$_3$)CH$_2$F, CF$_3$CF$_2$C(=O)CH$_2$CF$_2$CF$_3$, CF$_3$CF$_2$C(=O)CF(CF$_3$)CH$_2$F, CF$_3$CF$_2$C(=O)CHFCHFCF$_3$, CF$_3$CF$_2$C(=O)CH(CF$_3$)CHF$_2$, CF$_3$CF$_2$C(=O)CHFCF$_3$, CF$_3$CF$_2$C(=O)CF$_2$CHF$_2$, CF$_3$CF$_2$C(=O)CClFCF$_3$, CF$_3$CF$_2$C(=O)CF$_2$CF$_2$Cl, CF$_3$CF$_2$C(=O)CBrFCF$_3$, CF$_3$CF$_2$C(=O)CF$_2$CF$_2$Br, CF$_3$CF$_2$CF$_2$C(=O)CF$_2$CF$_2$CF$_3$, CF$_3$CF$_2$CF$_2$C(=O)CF(CF$_3$)$_2$, CF$_3$CF$_2$CF$_2$C(=O)CF$_2$CF$_2$CF$_2$CF$_3$, CF$_3$CF$_2$CF$_2$C(=O)CF$_2$CF(CF$_3$)$_2$, CF$_3$CF$_2$CF$_2$C(=O)CF(CF$_3$)CF$_2$CF$_3$, CF$_3$CF$_2$CF$_2$C(=O)CF$_2$CF$_2$CF$_2$CF$_3$, CF$_3$CF$_2$CF$_2$C(=O)CF(CF$_3$)CF$_2$CF$_3$, CF$_3$CF$_2$CF$_2$C(=O)CF(CF$_2$CF$_3$)$_2$, CF$_3$CF$_2$CF$_2$C(=O)CF$_2$CF$_2$CF$_2$CF$_2$CF$_3$, CF$_3$CF$_2$CF$_2$C(=O)CF(CF$_3$)CF$_2$CF$_2$CF$_3$, CF$_3$CF$_2$CF$_2$C(=O)CFCF$_3$)CF$_2$CF$_2$CF$_3$, CF$_3$CF$_2$CF$_2$C(=O)C(CF$_3$)$_2$CF$_2$CF$_3$, CF$_3$CF$_2$CF$_2$C(=O)CF$_2$CF(CF$_3$)CF$_2$CF$_3$, CF$_3$CF$_2$CF$_2$C(=O)CF(i—C$_3$F$_7$)CF$_2$CF$_3$, CF$_3$CF$_2$CF$_2$C(=O)CF(CF$_3$)CF$_2$CF(CF$_3$)$_2$, CF$_3$CF$_2$CF$_2$C(=O)CF$_2$CF$_2$CF$_2$CF$_2$CF$_2$CF$_3$, CF$_3$CF$_2$CF$_2$C(=O)CF(CF$_3$)CF$_2$CF$_2$CF$_2$CF$_3$, CF$_3$CF$_2$CF$_2$C(=O)CF$_2$CF$_2$CF=CF$_2$, CF$_3$CF$_2$CF$_2$C(=O)CF(CF$_3$)CF=CF$_2$, CF$_3$CF$_2$CF$_2$C(=O)CH(CF$_3$)CHFCF$_3$, CF$_3$CF$_2$CF$_2$C(=O)CH$_2$CFBrCF$_3$, CF$_3$CF$_2$CF$_2$C(=O)CBr(CF$_3$)CH$_2$F, CF$_3$CF$_2$CF$_2$C(=O)CHBrCHFCF$_3$, CF$_3$CF$_2$CF$_2$C(=O)CH(CF$_3$)CHFBr, CF$_3$CF$_2$CF$_2$C(=O)CH$_2$CFClCF$_3$, CF$_3$CF$_2$CF$_2$C(=O)CCl(CF$_3$)CH$_2$F, CF$_3$CF$_2$CF$_2$C(=O)CHClCHFCF$_3$, CF$_3$CF$_2$CF$_2$C(=O)CH(CF$_3$)CHFCl, CF$_3$CF$_2$CF$_2$C(=O)CH$_2$CHFCF$_3$, CF$_3$CF$_2$CF$_2$C(=O)CH(CF$_3$)CH$_2$F, CF$_3$CF$_2$CF$_2$C(=O)CH$_2$CF$_2$CF$_3$, CF$_3$CF$_2$CF$_2$C(=O)CF(CF$_3$)CH$_2$F, CF$_3$CF$_2$CF$_2$C(=O)CHFCHFCF$_3$, CF$_3$CF$_2$CF$_2$C(=O)CH(CF$_3$)CHF$_2$, CF$_3$CF$_2$CF$_2$C(=O)CHFCF$_3$, CF$_3$CF$_2$CF$_2$C(=O)CF$_2$CHF$_2$, CF$_3$CF$_2$CF$_2$C(=O)CClFCF$_3$, CF$_3$CF$_2$CF$_2$C(=O)CF$_2$CF$_2$Cl, CF$_3$CF$_2$CF$_2$C(=O)CBrFCF$_3$, CF$_3$CF$_2$CF$_2$C(=O)CF$_2$CF$_2$Br, CF$_3$CF$_2$CF$_2$C(=O)CF(CF$_3$)$_2$, (CF$_3$)$_2$CFC(=O)CF$_2$CF$_2$CF$_2$CF$_3$, (CF$_3$)$_2$CFC(=O)CF$_2$CF(CF$_3$)$_2$, (CF$_3$)$_2$CFC(=O)CF(CF$_3$)CF$_2$CF$_3$, (CF$_3$)$_2$CFC(=O)CF$_2$CF$_2$CF$_2$CF$_3$, (CF$_3$)$_2$CFC(=O)CF(CF$_3$)CF$_2$CF$_2$CF$_3$, (CF$_3$)$_2$CFC(=O)CF(CF$_2$CF$_3$)$_2$, (CF$_3$)$_2$CFC(=O)CF$_2$CF$_2$CF$_2$CF$_2$CF$_3$, (CF$_3$)$_2$CFC(=O)CF(CF$_3$)CF$_2$CF$_2$CF$_2$CF$_3$, (CF$_3$)$_2$CFC(=O)CF(CF$_2$CF$_3$)CF$_2$CF$_2$CF$_3$, (CF$_3$)$_2$CFC(=O)C(CF$_3$)$_2$CF$_2$CF$_2$CF$_3$, (CF$_3$)$_2$CFC(=O)CF$_2$CF(CF$_3$)CF$_2$CF$_2$CF$_3$, (CF$_3$)$_2$CFC(=O)CF(i—C$_3$F$_7$)CF$_2$CF$_3$, (CF$_3$)$_2$CFC(=O)CF(CF$_3$)CF$_2$CF(CF$_3$)$_2$, (CF$_3$)$_2$CFC(=O)CF(CF$_3$)CF$_2$CF$_2$CF$_2$CF$_2$CF$_3$, (CF$_3$)$_2$CFC(=O)CF$_2$CF$_2$CF=CF$_2$, (CF$_3$)$_2$CFC(=O)CF(CF$_3$)CF=CF$_2$, (CF$_3$)$_2$CFC(=O)CH(CF$_3$)CHFCF$_3$, (CF$_3$)$_2$CFC(=O)CH$_2$CFBrCF$_3$, (CF$_3$)$_2$CFC(=O)CBr(CF$_3$)CH$_2$F, (CF$_3$)$_2$CFC(=O)CHBrCHFCF$_3$, (CF$_3$)$_2$CFC(=O)CH(CF$_3$)CHFBr, (CF$_3$)$_2$CFC(=O)CH$_2$CFClCF$_3$, (CF$_3$)$_2$CFC(=O)CCl(CF$_3$)CH$_2$F, (CF$_3$)$_2$CFC(=O)CHClCHFCF$_3$, (CF$_3$)$_2$CFC(=O)CH(CH$_3$)CHFCl, (CF$_3$)$_2$CFC(=O)CHFCF$_3$, (CF$_3$)$_2$CFC(=O)CH(CF$_3$)CH$_2$F, (CF$_3$)$_2$CFC(=O)CH$_2$CF$_2$CF$_3$, (CF$_3$)$_2$CFC(=O)CF(CF$_3$)CH$_2$F, (CF$_3$)$_2$CFC(=O)CHFCHFCF$_3$, (CF$_3$)$_2$CFC(=O)CH(CF$_3$)CHF$_2$, (CF$_3$)$_2$CFC(=O)CHFCF$_3$, (CF$_3$)$_2$CFC(=O)CF$_2$CHF$_2$, (CF$_3$)$_2$CFC(=O)CClFCF$_3$, (CF$_3$)$_2$CFC(=O)CF$_2$CF$_2$Cl, (CF$_3$)$_2$CFC(=O)CBrFCF$_3$, (CF$_3$)$_2$CFC(=O)CF$_2$CF$_2$Br.

In another embodiment, the fluorine-containing ketone is at least one of the following compounds: CF$_3$C(=O)CF$_3$, CF$_3$C(=O)CF$_2$CF$_3$, CF$_3$C(=O)CF(CF$_3$)$_2$, CF$_3$C(=O)CF$_2$CF$_2$CF$_3$, CF$_3$C(=O)CF(CF$_3$)CF$_2$CF$_3$, CF$_3$C(=O)CF(CF$_3$)CF$_2$CF$_2$CF$_3$, CF$_3$C(=O)CF(CF$_2$CF$_3$)$_2$, CF$_3$C(=O)CF(CF$_2$CF$_3$)CF$_2$CF$_2$CF$_3$, CF$_3$C(=O)C(CF$_3$)CF$_2$CF$_2$CF$_3$, CF$_3$C(=O)CF(i—C$_3$F$_7$)CF$_2$CF$_3$, CF$_3$C(=O)CF(CF$_3$)CF$_2$CF$_2$CF$_2$CF$_2$CF$_3$, CF$_3$C(=O)CF$_2$CF$_2$CF=CF$_2$, CF$_3$C(=O)CF(CF$_3$)CF=CF$_2$, CF$_3$C(=O)CH(CF$_3$)CHFCF$_3$, CF$_3$C(=O)CH$_2$CFBrCF$_3$, CF$_3$C(=O)CBr(CF$_3$)CH$_2$F, CF$_3$C(=O)CHBrCHFCF$_3$, CF$_3$C(=O)CH(CF$_3$)CHFBr, CF$_3$C(=O)CH$_2$CFClCF$_3$, CF$_3$C(=O)CCl(CF$_3$)CH$_2$F, CF$_3$C(=O)CHClCHFCF$_3$, CF$_3$C(=O)CH(CF$_3$)CHFCl, CF$_3$C(=O)CH(CF$_3$)CH$_2$F, CF$_3$C(=O)CF(CF$_3$)CH$_2$F, CF$_3$C(=O)CH(CF$_3$)CHF$_2$, CF$_3$C(=O)CHFCF$_3$, CF$_3$C(=O)CF$_2$CHF$_2$, CF$_3$C(=O)CClFCF$_3$, CF$_3$C(=O)CF$_2$CF$_2$Cl, CF$_3$C(=O)CBrFCF$_3$, CF$_3$C(=O)CF$_2$CF$_2$Br, CF$_3$C(=O)CF$_2$CF$_2$CF$_3$, CF$_3$C(=O)CF(CF$_3$)$_2$, CF$_3$C(=O)CF$_2$CF(CF$_3$)$_2$, CF$_3$C(=O)CF(CF$_3$)CF$_2$CF$_3$, CF$_3$C(=O)CF(CF$_3$)CF$_2$CF$_2$CF$_3$, CF$_3$C(=O)CF(CF$_2$CF$_3$)$_2$, CF$_3$C(=O)CF(CF$_3$)CF$_2$CF$_2$CF$_3$, CF$_3$CF$_2$C(=O)CF(CF$_2$CF$_3$)CF$_2$CF$_2$CF$_3$, CF$_3$CF$_2$C(=O)C(CF$_3$)CF$_2$CF$_2$CF$_3$, CF$_3$CF$_2$C(=O)CF(i—C$_3$F$_7$)CF$_2$CF$_3$, CF$_3$CF$_2$C(=O)CF(CF$_3$)CF$_2$CF$_2$CF$_2$CF$_3$, CF$_3$CF$_2$C(=O)CF$_2$CF$_2$CF=CF$_2$, CF$_3$CF$_2$C(=O)CF(CF$_3$)CF=CF$_2$, CF$_3$CF$_2$C(=O)CH(CF$_3$)CHFCF$_3$, CF$_3$CF$_2$C(=O)CH$_2$CFBrCF$_3$, CF$_3$CF$_2$C(=O)CBr(CF$_3$)CH$_2$F, CF$_3$CF$_2$C(=O)CHBrCHFCF$_3$, F$_3$CF$_2$C(=O)CH(CF$_3$)CHFBr, CF$_3$CF$_2$C(=O)CH$_2$CFClCF$_3$, CF$_3$CF$_2$C(=O)CCl(CF$_3$)CH$_2$F, CF$_3$CF$_2$C(=O)CHClCHFCF$_3$, CF$_3$CF$_2$C(=O)CH(CF$_3$)CHFCl, CF$_3$CF$_2$C(=O)CH(CF$_3$)CH$_2$F, CF$_3$CF$_2$C(=O)CF(CF$_3$)CH$_2$F, CF$_3$CF$_2$C(=O)CH(CF$_3$)CHF$_2$, CF$_3$CF$_2$C(=O)CHFCF$_3$, CF$_3$CF$_2$C(=O)CF$_2$CHF$_2$, CF$_3$CF$_2$C(=O)CClFCF$_3$, CF$_3$CF$_2$C(=O)CF$_2$CF$_2$Cl, CF$_3$CF$_2$C(=O)CBrFCF$_3$, CF$_3$CF$_2$C(=O)CF$_2$CF$_2$Br, CF$_3$CF$_2$CF$_2$C(=O)CF(CF$_3$)$_2$, CF$_3$CF$_2$CF$_2$C(=O)CF$_2$CF(CF$_3$)$_2$, CF$_3$CF$_2$CF$_2$C(=O)CF(CF$_3$)CF$_2$CF$_3$, CF$_3$CF$_2$CF$_2$C(=O)CF(CF$_3$)CF$_2$CF$_2$CF$_3$, CF$_3$CF$_2$CF$_2$C(=O)CF(CF$_2$CF$_3$)$_2$, CF$_3$CF$_2$CF$_2$C(=O)CF(CF$_3$)CF$_2$CF$_2$CF$_3$, CF$_3$CF$_2$CF$_2$C(=O)CF(CF$_2$CF$_3$)CF$_2$CF$_2$CF$_3$, CF$_3$CF$_2$CF$_2$C(=O)C(CF$_3$)$_2$CF$_2$CF$_2$CF$_3$, CF$_3$CF$_2$CF$_2$C(=O)CF(i-C$_3$F$_7$)CF$_2$CF$_3$, CF$_3$CF$_2$CF$_2$C(=O)CF(CF$_3$)CF$_2$CF$_2$CF$_2$CF$_3$, CF$_3$CF$_2$CF$_2$C(=O)CF$_2$CF$_2$CF=CF$_2$, CF$_3$CF$_2$CF$_2$C(=O)CF(CF$_3$)CF=CF$_2$, CF$_3$CF$_2$CF$_2$C(=O)CH(CF$_3$)CHFCF$_3$, CF$_3$CF$_2$CF$_2$C(=O)CH$_2$CFBrCF$_3$, CF$_3$CF$_2$CF$_2$C(=O)CBr(CF$_3$)CH$_2$F, CF$_3$CF$_2$CF$_2$C(=O)CHBrCHFCF$_3$, CF$_3$CF$_2$CF$_2$C(=O)CH(CF$_3$)CHFBr, CF$_3$CF$_2$CF$_2$C(=O)CH$_2$CFClCF$_3$, CF$_3$CF$_2$CF$_2$C(=O)CCl(CF$_3$)CH$_2$F, CF$_3$CF$_2$CF$_2$C(=O)CHClCHFCF$_3$, CF$_3$CF$_2$CF$_2$C(=O)CH(CF$_3$)CHFCl, CF$_3$CF$_2$CF$_2$C(=O)CH(CF$_3$)CH$_2$F, CF$_3$CF$_2$CF$_2$C(=O)CF(CF$_3$)CH$_2$F, CF$_3$CF$_2$CF$_2$C(=O)CH(CF$_3$)CHF$_2$, CF$_3$CF$_2$CF$_2$C(=O)CHFCF$_3$, CF$_3$CF$_2$CF$_2$C(=O)CF$_2$CHF$_2$, CF$_3$CF$_2$CF$_2$C(=O)CClFCF$_3$, CF$_3$CF$_2$CF$_2$C(=O)CF$_2$CF$_2$Cl, CF$_3$CF$_2$CF$_2$C(=O)CBrFCF$_3$, CF$_3$CF$_2$CF$_2$C(=O)CF$_2$CF$_2$Br, CF$_3$CF$_2$CF$_2$C(=O)CF(CF$_3$)$_2$, (CF$_3$)CFC(=O)CF$_2$CF(CF$_3$)$_2$, (CF$_3$)CFC(=O)CF(CF$_3$)CF$_2$CF$_3$, (CF$_3$)CFC(=O)CF(CF$_3$)CF$_2$CF$_2$CF$_3$, (CF$_3$)CFC(=O)CF(CF$_2$CF$_3$)$_2$, (CF$_3$)CFC(=O)CF(CF$_3$)CF$_2$CF$_2$CF$_2$CF$_3$, (CF$_3$)CFC(=O)CF(CF$_2$CF$_3$)CF$_2$CF$_2$CF$_3$, (CF$_3$)CFC(=O)C(CF$_3$)$_2$CF$_2$CF$_2$CF$_3$, (CF$_3$)CFC(=O)CF(i-C$_3$F$_7$)CF$_2$CF$_3$, (CF$_3$)CFC(=O)CF(CF$_3$)CF$_2$CF$_2$CF$_2$CF$_3$, (CF$_3$)CFC(=O)CF$_2$CF$_2$CF=CF$_2$, (CF$_3$)CFC(=O)CF(CF$_3$)CF=CF$_2$, (CF$_3$)CFC(=O)CH(CF$_3$)CHFCF$_3$, (CF$_3$)CFC(=O)CH$_2$CFBrCF$_3$, (CF$_3$)CFC(=O)CBr(CF$_3$)CH$_2$F, (CF$_3$)CFC(=O)CHBrCHFCF$_3$, (CF$_3$)CFC(=O)CH(CF$_3$CHFBr, (CF$_3$)CFC(=O)CH$_2$CFClCF$_3$, (CF$_3$)CFC(=O)CCl(CF$_3$)CH$_2$F, (CF$_3$)CFC(=O)CHClCHFCF$_3$, (CF$_3$)CFC(=O)CH(CF$_3$)CHFCl, (CF$_3$)CFC(=O)CH(CF$_3$)CH$_2$F, (CF$_3$)CFC(=O)CF(CF$_3$)CH$_2$F, (CF$_3$)CFC(=O)CH(CF$_3$)CHF$_2$, (CF$_3$)CFC(=O)CHFCF$_3$, (CF$_3$)CFC(=O)CF$_2$CHF$_2$, (CF$_3$)CFC(=O)CClFCF$_3$, (CF$_3$)CFC(=O)CF$_2$CF$_2$Cl, (CF$_3$)CFC(=O)CBrFCF$_3$, (CF$_3$)CFC(=O)CF$_2$CF$_2$Br.

In another embodiment, the fluorine-containing ketone is at least one of the following compounds: $CF_3C(=O)CF_3$, $CF_3C(=O)CF_2CF_3$, $CF_3C(=O)CF(CF_3)_2$, $CF_3C(=O)CF_2CF(CF_3)_2$, $CF_3C(=O)CF(CF_2CF_3)_2$, $CF_3C(=O)CF(CF_2CF_3)CF_2CF_2CF_3$, $CF_3C(=O)CF_2CF_2CF=CF_2$, $CF_3C(=O)CF(CF_3)CF=CF_2$, $CF_3C(=O)CH(CF_3)CHFCF_3$, $CF_3C(=O)CH_2CFBrCF_3$, $CF_3C(=O)CBr(CF_3)CH_2F$, $CF_3C(=O)CHBrCHFCF_3$, $CF_3C(=O)CCl(CF_3)CH_2F$, $CF_3C(=O)CHClCHFCF_3$, $CF_3C(=O)CH(CF_3)CHFCl$, $CF_3C(=O)CH(CF_3)CH_2F$, $CF_3C(=O)CF(CF_3)CH_2F$, $CF_3C(=O)CH(CF_3)CHF_2$, $CF_3C(=O)CHFCF_3$, $CF_3C(=O)CClFCF_3$, $CF_3C(=O)CBrFCF_3$, $CF_3CF_2C(=O)CF_2CF_3$, $CF_3CF_2C(=O)CF(CF_3)_2$, $CF_3CF_2C(=O)CF_2CF(CF_3)_2$, $CF_3CF_2C(=O)CF(CF_2CF_3)_2$, $CF_3CF_2C(=O)CF(CF_2CF_3)CF_2CF_2CF_3$, $CF_3CF_2C(=O)CF_2CF_2CF=CF_2$, $CF_3CF_2C(=O)CF(CF_3)CF=CF_2$, $CF_3CF_2C(=O)CH(CF_3)CHFCF_3$, $CF_3CF_2C(=O)CH_2CFBrCF_3$, $CF_3CF_2C(=O)CBr(CF_3)CH_2F$, $CF_3CF_2C(=O)CHBrCHFCF_3$, $CF_3CF_2C(=O)CCl(CF_3)CH_2F$, $CF_3CF_2C(=O)CHClCHFCF_3$, $CF_3CF_2C(=O)CH(CF_3)CHFCl$, $CF_3CF_2C(=O)CH(CF_3)CH_2F$, $CF_3CF_2C(=O)CF(CF_3)CH_2F$, $CF_3CF_2C(=O)CH(CF_3)CHF_2$, $CF_3CF_2C(=O)CHFCF_3$, $CF_3CF_2C(=O)CClFCF_3$, $CF_3CF_2C(=O)CBrFCF_3$, $(CF_3)_2CFC(=O)CF(CF_3)_2$, $(CF_3)_2CFC(=O)CF_2CF(CF_3)_2$, $(CF_3)_2CFC(=O)CF(CF_2CF_3)_2$, $(CF_3)_2CFC(=O)(CF_2CF_3)CF_2CF_2CF_3$, $(CF_3)_2CFC(=O)CF_2CF_2CF=CF_2$, $(CF_3)_2CFC(=O)CF(CF_3)CF=CF_2$, $(CF_3)_2CFC(=O)CH(CF_3)CHFCF_3$, $(CF_3)_2CFC(=O)CH_2CFBrCF_3$, $(CF_3)_2CFC(=O)CBr(CF_3)CH_2F$, $(CF_3)_2CFC(=O)CHBrCHFCF_3$, $(CF_3)_2CFC(=O)CCl(CF_3)CH_2F$, $(CF_3)_2CFC(=O)CHClCHFCF_3$, $(CF_3)_2CFC(=O)CH(CF_3)CHFCl$, $(CF_3)_2CFC(=O)CH(CF_3)CH_2F$, $(CF_3)_2CFC(=O)CF(CF_3)CH_2F$, $(CF_3)_2CFC(=O)CH(CF_3)CHF_2$, $(CF_3)_2CFC(=O)CHFCF_3$, $(CF_3)_2CFC(=O)CClFCF_3$, $(CF_3)_2CFC(=O)CBrFCF_3$.

In another embodiment, the fluorine-containing ketone is at least one of the following compounds: $CF_3C(=O)CF_3$, $CF_3C(=O)CF_2CF_3$, $CF_3C(=O)CF(CF_3)_2$, $CF_3C(=O)CF_2CF(CF_3)_2$, $CF_3C(=O)CF(CF_3)CF=CF_2$, $CF_3C(=O)CH(CF_3)CHFCF_3$, $CF_3C(=O)CH_2CFBrCF_3$, $CF_3C(=O)CBr(CF_3)CH_2F$, $CF_3C(=O)CHBrCHFCF_3$, $CF_3C(=O)CCl(CF_3)CH_2F$, $CF_3C(=O)CH(CF_3)CHFCl$, $CF_3C(=O)CHFCF_3$, $CF_3C(=O)CClFCF_3$, $CF_3C(=O)CBrFCF_3$, $CF_3CF_2C(=O)CF_2CF_3$, $CF_3CF_2C(=O)CF(CF_3)_2$, $CF_3CF_2C(=O)CF(CF_3)CF=CF_2$, $CF_3CF_2C(=O)CH$ $(CF_3)CHFCF_3$, $CF_3CF_2C(=O)CH_2CFBrCF_3$, $CF_3CF_2C(=O)CBr(CF_3)CH_2F$, $CF_3CF_2C(=O)CHBrCHFCF_3$, $CF_3CF_2C(=O)CCl(CF_3)CH_2F$, $CF_3CF_2C(=O)CH(CF_3)CHFCl$, $CF_3CF_2C(=O)CHFCF_3$, $CF_3CF_2C(=O)CClFCF_3$, $CF_3CF_2C(=O)CBrFCF_3$, $CF_3CF_2CF_2C(=O)CF(CF_3)_2$, $CF_3CF_2CF_2C(=O)CF_2CF(CF_3)_2$, $CF_3CF_2CF_2C(=O)CF$ $(CF_3)CF=CF_2$, $CF_3CF_2CF_2C(=O)CH(CF_3)CHFCF_3$, $CF_3CF_2CF_2C(=O)CH_2CFBrCF_3$, $CF_3CF_2CF_2C(=O)CBr$ $(CF_3)CH_2F$, $CF_3CF_2CF_2C(=O)CHBrCHFCF_3$, $CF_3CF_2CF_2C(=O)CCl(CF_3)CH_2F$, $CF_3CF_2CF_2C(=O)CH$ $(CF_3)CHFCl$, $CF_3CF_2CF_2C(=O)CHFCF_3$, $CF_3CF_2CF_2C(=O)CClFCF_3$, $CF_3CF_2CF_2C(=O)CBrFCF_3$, $(CF_3)CFC(=O)CF(CF_3)CF_3)_2$, $(CF_3)CFC(=O)CF_2CF(CF_3)_2$, $(CF_3)CFC(=O)CF(CF_3)CF=CF_2$, $(CF_3)CFC(=O)CH(CF_3)CHFCF_3$, $(CF_3)CFC(=O)CH_2CFBrCF_3$, $(CF_3)CFC(=O)CBr(CF_3)CH_2F$, $(CF_3)CFC(=O)CHBrCHFCF_3$, $(CF_3)CFC(=O)CCl(CF_3)CH_2F$, $(CF_3)CFC(=O)CH(CF_3)CHFCl$, $(CF_3)CFC(=O)CHFCF_3$, $(CF_3)CFC(=O)CClFCF_3$, $(CF_3)CFC(=O)CBrFCF_3$.

In another embodiment, the fluorine-containing ketone is at least one of the following compounds: $CF_3C(=O)CF_3$, $CF_3C(=O)CF_2CF_3$, $CF_3C(=O)CF(CF_3)_2$, $CF_3C(=O)CF_2CF(CF_3)_2$, $CF_3C(=O)CBr(CF_3)CH_2F$, $CF_3C(=O)CBrFCF_3$, $CF_3CF_2C(=O)CF_2CF_3$, $CF_3CF_2C(=O)CF(CF_3)_2$, $CF_3CF_2C(=O)CBr(CF_3)CH_2F$, $CF_3CF_2C(=O)CBrFCF_3$, $CF_3CF_2C(=O)CF(CF_3)_2$, $CF_3CF_2CF_2C(=O)CF_2CF(CF_3)_2$, $CF_3CF_2CF_2C(=O)CBr(CF_3)CH_2F$, $CF_3CF_2CF_2C(=O)CBrFCF_3$, $(CF_3)_2CFC(=O)CF(CF_3)_2$, $(CF_3)_2CFC(=O)CF_2CF(CF_3)_2$, $(CF_3)_2CFC(=O)CBr(CF_3)CH_2F$, $(CF_3)_2CFC(=O)CBrFCF_3$.

In another embodiment, the fluorine-containing ketone is at least one selected from the group consisting of $CF_3C(=O)CF(CF_3)CF_3$, $CF_3CF_2CF_2C(=O)CF(CF_3)_2$, $CF_3CF_2CF_2C(=O)CF(CF_3)CF_3$ and $(CF_3)CFC(=O)CF(CF_3)_2$. When the fluorine-containing ketone is at least one selected from the group consisting of $CF_3C(=O)CF(CF_3)CF_3$, $CF_3CF_2CF_2C(=O)CF(CF_3)_2$, $CF_3CF_2CF_2C(=O)CF(CF_3)CF_3$ and $(CF_3)_2CFC(CF_3)_2$, the four fluorine-containing ketones may be mixed at any mass ratio. Preferably, the mass ratio of $CF_3C(=O)CF(CF_3)CF_3$ to $CF_3CF_2CF_2C(=O)CF(CF_3)_2$ to $CF_3CF_2CF_2C(=O)CF(CF_3)CF_3$ to $(CF_3)_2CFC(=O)CF)_2$ is 0-30: 0-50: 0-70: 0-65, and the mass ration of at least one selected from the group consisting of $CF_3C(=O)CF(CF_3)CF_3$, $CF_3CF_2CF_2C(=O)CF(CF_3)_2$, $CF_3CF_2CF_2C(=O)CF(CF_3)CF_3$ and $(CF_3)_2CFC(=O)CF(CF_3)_2$ is greater than zero. More preferably, the mass ratio of $CF_3C(=O)CF(CF_3)CF_3$ to $CF_3CF_2CF_2C(=O)CF(CF_3)_2$ to $CF_3CF_2CF_2C(=O)CF(CF_3)CF_3$ to $(CF_3)_2CFC(=O)CF(CF_3)_2$ is 0-20: 0-40: 0-35: 0-65, and the mass ration of at least one selected from the group consisting of $CF_3C(=O)CF(CF_3)CF_3$, $CF_3CF_2CF_2C(=O)CF(CF_3)_2$, $CF_3CF_2CF_2C(=O)CF(CF_3)CF_3$ and $(CF_3)_2$ is greater than zero.

Representative fluorine-containing ketone includes, but is not limited to, the compounds listed in Table 1.

TABLE 1

| No. | fluorine-containing ketone | Structure |
|---|---|---|
| 1 | 1,1,1,3,3,3-hexafluoroacetone | $CF_3C(=O)CF_3$ |
| 2 | 1,1,1,3,3,4,4,4-octafluoro-2-butanone | $CF_3C(=O)CF_2CF_3$ |
| 3 | 3-trifluoromethyl-1,1,1,3,4,4,4-heptafluoro-2-butanone | $CF_3C(=O)CF(CF_3)CF_3$ |
| 4 | 4-trifluoromethyl-1,1,1,3,3,4,5,5,5-nonafluoro-2-pentanone | $CF_3C(=O)CF_2CF(CF_3)CF_3$ |
| 5 | 3-trifluorovinyl-1,1,1,3,4,4,4-heptafluoro-2-butanone | $CF_3C(=O)CF(CF_3)CF=CF_2$ |
| 6 | 3-trifluoromethyl-3-bromo-1,1,1,4-tetrafluoro-2-butanone | $CF_3C(=O)CBr(CF_3)CH_2F$ |
| 7 | 3-bromo-1,1,1,3,4,4,4-heptafluoro-2-butanone | $CF_3C(=O)CBrFCF_3$ |
| 8 | 1,1,1,2,2,4,4,5,5,5-decafluoro-3-pentanone | $CF_3CF_2C(=O)CF_2CF_3$ |

TABLE 1-continued

| No. | fluorine-containing ketone | Structure |
|---|---|---|
| 9 | 2-trifluoromethyl-1,1,1,2,4,4,5,5,5-nonafluoro-3-pentanone | $CF_3CF_2C(=O)CF(CF_3)CF_3$ |
| 10 | 2-trifluoromethyl-2-bromo-1,4,4,5,5,5-hexafluoro-3-pentanone | $CF_3CF_2C(=O)CBr(CF_3)CH_2F$ |
| 11 | 2-bromo-1,1,1,2,4,4,5,5,5-nonafluoro-3-pentanone | $CF_3CF_2C(=O)CBrFCF_3$ |
| 12 | 2-trifluoromethyl-1,1,1,2,4,4,5,5,6,6,6-undecafluoro-3-hexanone | $CF_3CF_2CF_2C(=O)CF(CF_3)CF_3$ |
| 13 | 2-trifluoromethyl-1,1,1,2,3,3,5,5,6,6,7,7,7-tridecafluoro-4-heptanone | $CF_3CF_2CF_2C(=O)CF_2CF(CF_3)CF_3$ |
| 14 | 2-trifluoromethyl-2-bromo-1,4,4,5,5,6,6,6-octafluoro-3-hexanone | $CF_3CF_2CF_2C(=O)CBr(CF_3)CH_2F$ |
| 15 | 2-bromo-1,1,1,2,4,4,5,5,6,6,6-undecafluoro-3-hexanone | $CF_3CF_2CF_2C(=O)CBrFCF_3$ |
| 16 | 2,4-bis (trifluoromethyl)-1,1,1,2,4,5,5,5-octafluoro-3-pentanone | $(CF_3)_2CFC(=O)CF(CF_3)CF_3$ |
| 17 | 2,5-bis(trifluoromethyl)-1,1,1,2,4,4,5,5,6,6,6-decafluoro-3-hexanone | $(CF_3)_2CFC(=O)CF_2CF(CF_3)CF_3$ |
| 18 | 2,4-bis(trifluoromethyl)-2-bromo-1,4,5,5,5-pentafluoro-3-pentanone | $(CF_3)_2CFC(=O)CBr(CF_3)CH_2F$ |
| 19 | 2-trifluoromethyl-4-bromo-1,1,1,2,4,5,5-heptafluoro-3-pentanone | $(CF_3)_2CFC(=O)CBrFCF_3$ |

The stabilizer of the present invention, is at least one selected from the group consisting of an epoxy compound, a nitro compound, a hindered phenol compound, a β-diketone compound, a phosphite compound, a salicylate compound, a cinnamate compound, a hydroxybenzophenone compound, a hydroxybenzoic acid compound, an alkoxymethane compound and an organic thio compound.

Wherein the epoxy compound is an epoxy compound understood by the person having ordinary skill in the art and is generally a chain compound containing the following structure (1), wherein $R_1$, $R_2$, $R_3$ and $R_4$ may be separate substituents or a cyclic substituent, for example, 1,2-epoxycyclopentane or compounds having a similar structure thereto.

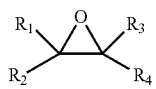

(I)

In one embodiment, the epoxy compound is at least one selected from the group consisting of epoxyethane, 1,2-epoxypropane, 1,2-epoxybutane, 1,2-epoxycyclopentane, 1,2-epoxycyclohexane, 1,2-epoxyisobutane, 1,2-epoxyethylbenzene, 4-vinyl-1-cyclohexene diepoxide and 1-tert-butoxy-2,3-epoxypropane. In another embodiment, the epoxy compound is at least one selected from the group consisting of 1,2-epoxypropane, 1,2-epoxycyclopentane, 1,2-epoxycyclohexane, 1,2-epoxyisobutane and 1,2-epoxyethylbenzene. In another embodiment, the epoxy compound is at least one selected from the group consisting of 1,2-epoxypropane, 1,2-epoxycyclohexane, and 1,2-epoxyethylbenzene.

The nitro compound is a nitro compound understood by the person having ordinary skill in the art, which is generally a compound containing a nitro group (—$NO_2$). In one embodiment, the nitro compound is at least one selected from the group consisting of nitromethane, nitromethane, 1-nitropropane, 2-nitropropane, nitrobenzene and p-dinitrophenylalkane. In another embodiment, the nitro compound is at least one of nitromethane or nitrobenzene. In another embodiment, the nitro compound is nitromethane.

The hindered phenolic compound is a hindered phenolic compound understood by the person having ordinary skill in the art and is generally a phenolic compound having an anti-oxidation effect. In one embodiment, the hindered phenolic compound is at least one selected from the group consisting of bisphenol A, p-nonylphenol, thymol, p-methoxyphenol, p-benzyloxyphenol, catechol, resorcinol, p-tert-butylcatechol, 4,4'-butylidenebis (6-tert-butyl-m-cresol), 2,2'-methylenebis (6-tert-butyl-p-cresol), 2,6-di-tert-butyl-p-cresol, 2,6-di-tert-butylphenol, 2,4,6-tris(3',5'-di-tert-butyl-4'-hydroxybenzyl) mesitylene, stearyl 3-(3,5-di-tert-butyl-4-hydroxyphenyl)propionate,1,3,5-tris (4-tert-butyl-3-hydroxy-2,6-dimethylbenzyl)-triazine-2,4,6-(1H, 3H,5H)-trione and 2,2'-thiodiethylbis (3-(3,5-di-tert-butyl-4-hydroxyphenyl)propionate). In another embodiment, the hindered phenolic compound is at least one selected from the group consisting of thymol, catechol, resorcinol, p-tert-butylcatechol, 2,6-di-tert-butyl-p-cresol and 2,6-di-tert-butylphenol. In another embodiment, the hindered phenolic compound is at least one selected from the group consisting of thymol, catechol, resorcinol and p-tert-butylcatechol.

The β-diketone compound is a β-diketone understood by the person having ordinary skill in the art and is generally a compound having another carbonyl group in the β-position of the carbonyl group, that is, a compound containing (—C(=O)—$CH_2$—C(=O)—) group. In one embodiment, the β-diketone compound is at least one selected from the group consisting of dibenzoylmethane and stearoylbenzoylmethane. In another embodiment, the β-diketone compound is dibenzoylmethane.

The phosphite compound is a phosphite compound understood by the person having ordinary skill in the art and is generally a compound having the structure of $P(OR_1)(OR_2)OR_3$, wherein $R_1$, $R_2$, and $R_3$ are substituent groups having a chain or cyclic structure. In one embodiment, the phosphite compound is at least one selected from the group consisting of trimethyl phosphite, diethyl phosphite, diisopropyl phosphite, triisopropyl phosphite, tributyl phosphite, diphenyl phosphite, triphenyl phosphite, dibenzyl phosphite, tribenzyl phosphite, decyl diphenyl phosphite, tridecyl phosphite, dioctadecyl pentaerythritol diphosphite, tris(nonylphenyl) phosphite, bis(2,4-di-tert-butylphenyl) pentaerythritol diphosphite and tris(2,4-di-tert-butylphenyl) phosphite. In another embodiment, the phosphite compound is at least one selected from the group consisting of trimethyl phosphite, diethyl phosphite, diisopropyl phosphite, tributyl phosphite, diphenyl phosphite, triphenyl phosphite, dibenzyl phosphite, tribenzyl phosphite, triphenyl phosphite, tridecyl phosphite and dioctadecyl pentaerythritol diphosphite. In another embodiment, the phosphite compound is at least one selected from the group consisting of trimethyl phosphite, diisopropyl phosphite, dibenzyl phosphite, tribenzyl phosphite, triphenyl phosphite and tridecyl phosphite.

The salicylate compound is a salicylate compound understood by the person having ordinary skill in the art and is generally a compound having the following structure (II), wherein R is a substituent group having a chain or cyclic structure.

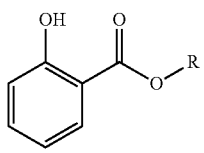
(II)

In one embodiment, the salicylate compound is at least one selected from the group consisting of methyl salicylate, ethyl salicylate, butyl salicylate, isooctyl salicylate, 4-tert-butylphenyl salicylate and phenyl salicylate. In another embodiment, the salicylate compound is at least one of methyl salicylate, butyl salicylate, isooctyl salicylate or phenyl salicylate. In another embodiment, the salicylate compound is at least one of methyl salicylate or phenyl salicylate.

The cinnamate compound is a cinnamate compound understood by the person having ordinary skill in the art and is generally a compound having a PhCH=CHCO$_2$R structure, wherein R is a substituent group having a chain or cyclic structure. In one embodiment, the cinnamate compound is at least one selected from the group consisting of ethyl 3-diphenylacrylate, benzyl 3-phenylacrylate ethyl 2-cyano-3,3-diphenylacrylate and 2-ethylhexyl 2-cyano-3,3-dipbenylacrylate. In another embodiment, the cinnamate compound is at least one of ethyl 3-diphenylacrylate, benzyl 3-phenylacrylate or ethyl 2-cyano-3,3-diphenylacrylate. In another embodiment, the cinnamate compound is at least one of benzyl 3-diphenylacrylate or ethyl 2-cyano-3,3-diphenylacrylate.

The hydroxybenzophenone compound is a 2-hydroxybenzophenone compound understood by the person having ordinary skill in the art and is generally a compound having the following structure (III), wherein $R_1$ and $R_2$ are substituent groups having a chain or cyclic structure, and the substituent group may be in any position on the benzene ring.

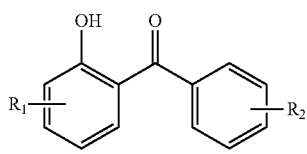
(III)

In one embodiment, the hydroxyhenzophenone compound is at least one selected from the group consisting of 2,4-dihydroxybenzophenone, 2-hydroxy-4-methoxybenzophenone, 2,2'-dihydroxy-methoxybenzophenone, 2,2'4,4'-tetrahydroxybenzophenone, 2,2'-dihydroxy-4,4'-dimethoxybenzophenone and 2-hydroxy-4-(octyloxy) benzophenone. In another embodiment, the hydroxybenzophenone compound is at least one selected from the group consisting of 2,4-dihydroxybenzophenone, 2-hydroxy-4-methoxybenzophenone, 2,2',4,4'-tetrahydroxybenzophenone and 2,2'-dihydroxy-4,4'-dimethoxybenzophenone. In another embodiment, the hydroxybenzophenone compound is at least one selected from the group consisting of 2-hydroxy-4-methoxybenzophenone and 2,2'-dihydroxy-4,4'-dimethoxybenzophenone.

The hydroxybenzoic acid compound is 4-hydroxybenzoic acids and their derived carboxylic acid ester compounds understood by the person having ordinary skill in the art, and generally has the following structure (IV), wherein $R_1$ and $R_2$ are substituent groups having a chain or cyclic structure, and $R_1$ substitute group may be at any position of the benzene ring.

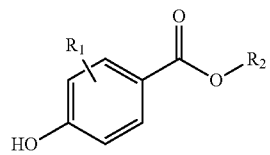
(IV)

In one embodiment, the hydroxybenzoic acid compound is at least one selected from the group consisting of 2,4-di-tert-butylphenyl 3,5-di4tert-butyl-4-hydroxybenzoate and n-hexadecyl 3,5-di-tert-butyl-4-hydroxybenzoate. In another embodiment, the hydroxybenzoic acid compound is n-hexadecyl 3,5-di-tert-butyl-4-hydroxybenzoate.

The alkoxymethane compound is an alkoxymethane compound understood by the person having ordinary skill in the art and is generally a compound having the structure of HC(OR$_1$)(OR$_2$)OR$_3$ wherein $R_1$, $R_2$ and $R_3$ are substituent groups having a chain or cyclic structure. In one embodiment, the alkoxymethane compound is at least one selected from the group consisting of trimethoxymethane, triethoxymethane, tri-n-propoxymethane, tri-n-butoxymethane, tripentyloxymethane, trimethoxy phenylmethane, diethoxy benzyloxymethane, diethoxy alkenyloxymethane and tris-(chloroethoxy) methane. In another embodiment, the alkoxymethane compound is at least one selected from the group consisting of trimethoxymethane, triethoxymethane, tri-n-propoxymethane, tri-n-butoxymethane, trimethoxy phenylmethane and tris-(chloroethoxy)methane. In another embodiment, the alkoxymethane compound is at least one selected from the group consisting of trimethoxymethane, triethoxymethane, tri-n-propoxymethane, trimethoxy phenylmethane and tris-(chloroethoxy) methane.

The organic thio compound is an organic thiodipropionic acid compound understood by the person having ordinary skill in the art and generally has a structure of ($R_1$—OC)(=O)—CH$_2$CH$_2$—S—CH$_2$CH$_2$—C(=O)O—R$_2$), wherein $R_1$ and $R_2$ are substituent groups having a chain or cyclic structure. In one embodiment, the organic thio compound is at least one selected from the group consisting of dilauryl 3,3'-thiodipropionate, dioctadecyl 3,3'-thiodipropionate and dimyristyl 3,3'-thiodipropionate. In another embodiment, the organic thio compound is dilauryl 3,3'-thiodipropionate.

Representative stabilizers include, but are not limited to, the compounds listed in Table 2.

TABLE 2

| Stabilizer | Abbr. | Molecular formula | CAS No. | Melting point/° C. | Boiling point/° C. |
|---|---|---|---|---|---|
| propylene oxide | EPP | C$_3$H$_6$O | 75-56-9 | −112 | 34 |
| 1,2-epoxycyclohexane | EPCH | C$_6$H$_{10}$O | 286-20-4 | −40 | 129-130 |
| 1,2-epoxystyrol | EPS | C$_8$H$_8$O | 96-09-3 | −37 | 194 |

TABLE 2-continued

| Stabilizer | Abbr. | Molecular formula | CAS No. | Melting point/° C. | Boiling point/° C. |
|---|---|---|---|---|---|
| nitromethane | NTM | $CH_3NO_2$ | 75-52-5 | −28.55 | 101.2 |
| thymol | PCO | $C_{10}H_{14}O$ | 89-83-8 | 48-51 | 232 |
| catechol | ODHB | $C_6H_6O_2$ | 120-80-9 | 103 | 245 |
| resorcinol | MDHB | $C_6H_6O_2$ | 108-46-3 | 109-112 | 281 |
| p-tert-butylcatecholResorcinol | TBC | $C_{10}H_{14}O_2$ | 98-29-3 | 52-55 | 285 |
| dibenzoylmethane | DBM | $C_{15}H_{12}O_2$ | 120-46-7 | 77-79 | 219-221 (@18 mmHg) |
| trimethyl phosphite | TMP | $C_3H_9O_3P$ | 121-45-9 | −78 | 112 |
| diisopropyl phosphite | DIPP | $C_6H_{15}O_3P$ | 1809-20-7 | — | 72-75 |
| dibenzyl phosphite | DBP | $C_{14}H_{15}O_3P$ | 17176-77-1 | — | — |
| tribenzyl phosphite | TBP | $C_{21}H_{21}O_3P$ | 15205-57-9 | — | — |
| triphenyl phosphite | TPP | $C_{18}H_{15}O_3P$ | 101-02-0 | 22-24 | 360 |
| tridecyl phosphite | TDP | $C_{30}H_{63}O_3P$ | 2929-86-4 | — | — |
| methyl salicylate | MSA | $C_8H_8O_3$ | 119-36-8 | −8 | 222 |
| phenyl salicylate | PSA | $C_{13}H_{10}O_3$ | 118-55-8 | 40-44 | 172-173 |
| benzyl 3-phenylacrylate | BCM | $C_{16}H_{14}O_2$ | 103-41-3 | 34-37 | 195-200 |
| ethyl 2-cyano-3,3-diphenylacrylate | ECDP | $C_{18}H_{15}NO_2$ | 5232-99-5 | 97-99 | — |
| 2-hydroxy-4-methoxybenzophenone | HMBP | $C_{14}H_{12}O_3$ | 131-57-7 | 62.5 | 150-160 |
| 2,2'-dihydroxy-4,4'-dimethoxybenzophenone | DDBP | $C_{15}H_{14}O_5$ | 131-54-4 | 133-136 | — |
| n-hexadecyl 3,5-bis-tert-butyl-4-hydroxybenzoate | HDBB | $C_{31}H_{54}O_3$ | 67845-93-3 | 59-61 | — |
| trimethoxymethane | TMM | $C_4H_{10}O_3$ | 149-73-5 | −53 | 101-102 |
| triethoxymethane | TEM | $C_7H_{16}O_3$ | 122-51-0 | −61 | 146 |
| tri-n-propoxymethane | TPM | $C_{10}H_{22}O_3$ | 621-76-1 | — | 106-108 (@40 mmHg) |
| trimethoxy phenylmethane | TMB | $C_{10}H_{14}O_3$ | 707-07-3 | — | 87-88 (@7 mmHg) |
| tris-(chloroethoxy)methane | TCEM | $C_7H_{13}C_{13}O_3$ | 18719-58-9 | — | 293.1 |
| dilauryl 3,3'-thiodipropionate | DLTDP | $C_{30}H_{58}O_4S$ | 123-28-4 | 40-42 | — |

The present invention provides stabilizers, wherein some of the stabilizers exist as various configurational isomers or stereoisomers. Single isomer or multiple isomers of the same compound may be used in any ratio to produce a stabilizer blend. In addition, single or multiple isomers of a given compound may be combined with many other compounds in any ratio to act as a stabilizer blend. The present invention is intended to include all single configurational isomers, single stereoisomers, or any combination or mixture thereof.

The composition of the present invention may use any suitable effective amount of a stabilizer. An "effective amount" refers to an amount of a stabilizer of the present invention when added to a composition comprising at least one fluorine-containing ketone, which will not result in degradation that causing a decreasing operation performance comparable to a composition with no stabilizer. In one embodiment, the mass ratio of the stabilizer to the fluorine-containing ketone ranges from 0.1:1000 to 50:1000. In another embodiment, the mass ratio of the stabilizer to the fluorine-containing ketone is 0.5:1000 to 10:1000, In one embodiment, the mass ratio of the stabilizer to the fluorine-containing ketone ranges from 0.5:1000 to 5:1000.

The present invention further directs to a method of stabilizing a composition comprising at least one fluorine-containing ketone, said method comprising adding an effective amount of a compound stabilizer, comprising at least one of an epoxy compound, a nitro compound, a hindered phenolic compound, a β-diketone compound, a phosphite compound, a salicylate compound, a cinnamate compound, a hydroxybenzophenone compound, a hydroxybenzoic acid compound, an alkoxymethane compound or an organic thio compound, to a composition comprising at least one fluorine-containing ketone.

The present invention further directs to a method of reducing degradation of a composition comprising at least one fluorine-containing ketone, the degradation resulting from the presence of moisture in a fire extinguishing, washing, refrigeration, air conditioning or heat pump system, and the method comprises adding an effective amount of a compound stabilizer, comprising at least one of a hindered phenol compound, a β-diketone compound, a phosphite compound, a hydroxybenzophenone compound or an alkoxymethane compound, to a composition comprising at least one fluorine-containing ketone.

The present invention further directs to a method of reducing degradation of a composition comprising at least one fluorine-containing ketone, the degradation resulting from the presence of moisture and metals in a fire extinguishing, washing, refrigeration, air conditioning or heat pump system, and the method comprises adding an effective amount of a compound stabilizer, comprising at least one of a hindered phenol compound, a β-diketone compound, a phosphite compound, a hydroxybenzophenone compound, an alkoxymethane compound or an organic thio compound, to a composition comprising at least one fluorine-containing ketone.

The present invention further directs to a method of reducing degradation of a composition comprising at least one fluorine-containing ketone, the degradation resulting from the presence of moisture, metals and acids in a fire extinguishing, washing, refrigeration, air conditioning or heat pump system, and the method comprises adding an effective amount of a compound stabilizer, comprising at least one of a nitro compound, a hindered phenol compound, a β-diketone compound, a phosphite compound, salicylate compounds, a cinnamate compound, a hydroxybenzophenone compound, a hydroxybenzoic acid compound, an alkoxymethane compound or an organic thio compound, to a composition comprising at least one fluorine-containing ketone.

The present invention further directs to a method of reducing degradation of a composition comprising at least one fluorine-containing ketone under moisture and light, said method comprising adding an effective amount of a compound stabilizer, comprising at least one of a hindered phenolic compound, a β-diketone compound, a phosphite compound, a salicylate compound, a cinnamate compound, a hydroxybenzophenone compound, a hydroxybenzoic acid compound or an alkoxymethane compound, to a composition comprising at least one fluorine-containing ketone.

The present invention further directs to a method of reducing reaction between oxygen and a composition comprising at least one fluorine-containing ketone, said method comprising adding an effective amount of a compound stabilizer, comprising at least one of an epoxy compound, a nitro compound, a hindered phenolic compound, a β-diketone compound, a phosphite compound, a salicylate compound, a cinnamate compound, a hydroxyhenzophenone compound, a hydroxybenzoic acid compound or an alkoxymethane compound, to a composition comprising at least one fluorine-containing ketone.

The present invention further directs to a method of suppressing a flame, the method comprising applying at least a composition to at least a portion of the flame or to a fuel source of the flame, the composition comprising at least one fluorine-containing ketone and an effective amount of a stabilizer, the stabilizer comprising at least one of an epoxy compound, a nitro compound, a hindered phenol compound, a β-diketone compound, a phosphite compound, a salicylate compound, a cinnamate compound, a hydroxybenzophenone compound, a hydroxybenzoic acid compound, an alkoxymethane compound or an organic thio compound.

The present invention further directs to a method of extinguishing a fire, the method comprising applying at least a composition to prevent ignition or deflagration of combustible materials in a hermetically sealed space containing air, the composition comprising at least one of fluorine-containing ketone and an effective amount of a stabilizer, the stabilizer comprising at least one of an epoxy compound, a nitro compound, a hindered phenol compound, a β-diketone compound, a phosphite compound, a salicylate compound, a cinnamate compound, a hydroxybenzophenone compound, a hydroxy benzoic acid compound, an alkoxymethane compound or an organic thio compound.

The present invention further directs to applications of said compositions. The compositions may be used as an extinguishing agent, heat transfer medium, magnesium alloy melt protective agent, solvent, cleaning agent, blowing agent, aerosol propellant, insulating medium or electron etching gas. When the composition is used as a fire extinguishing agent, it is particularly suitable for use in a pipe network fire extinguishing system, a cabinet fire extinguishing system, a hanging fire extinguishing system or a portable fire extinguisher. When the composition is used as a heat transfer medium, it is particularly suitable for use in a refrigerator, a cooler, an organic rankine cycle device, a heat pump or a container. When the composition is used as an insulating medium or an arc extinguishing medium, it is particularly suitable for medium voltage, high voltage, extra high voltage power electrical equipment.

The principle of the test method in the following examples refers to the standard of refrigerant test ASHRAE 97: 2007, using a pressure-resistant container, adding the fluorine-containing ketone composition under normal pressure or under vacuum, and then inflating with nitrogen or air, maintaining at a certain temperature for several days, thereafter placing under a condition, such as darkness or light according to different test configurations. After reaching a set number of days, lower the temperature down to room temperature, then do sampling analysis. Filling factor refers to ISO 14520-5: 2005. Moisture unit is mg/kg, and will be denoted as ppm hereinafter. Acidity is calculated by HCl, unit being mg/kg, and will be denoted as ppm hereinafter.

EXAMPLE

Example 1

105 g of 1,1,1,2,2,4,5,5,5-nonafluoro-4-(trifluoromethyl)-3-pentanone is drawn under vacuum in a 100 mL stainless steel cylinder lined with tetrafluoroethylene. Stabilizer composition and addition amount is shown in Table 3. Undried common industrial nitrogen is inflated at 20° C. to 25 bar; after sealed, the cylinder is heated to then placed quiescently at 60° C.; then do sampling analysis on day 10, day 30 and day 60, and the results are shown in Table 4.

Examples 2-6

The composition and amount of stabilizers is modulated, the rest of the operation being consistent with Example 1. The composition and amount of stabilizers is shown in Table 3. On day 10, day 30 and day 60 do sampling analysis, and the results are shown in Table 4.

Example 7

105 g of 1,1,1,2,2,4,5,5,5-nonafluoro-4-(trifluoromethyl)-3-pentanone is drawn under vacuum in a 100 mL carbon steel cylinder. Stabilizer composition and addition amount is shown in Table 3. Undried common industrial nitrogen is inflated at 20° C. to 25 bar; after sealed, the cylinder is heated to then placed quiescently at 60° C.; then do sampling analysis on day 10, day 30 and day 60, and the results are shown in Table 4.

Examples 8-9

The composition and amount of stabilizers is modulated, the rest of the operation being consistent with Example 7. The composition and amount of stabilizers is shown in Table 3. On day 10, day 30 and day 60 do sampling analysis, and the results are shown in Table 4.

Example 10

105 g of 1,1,1,2,2,4,5,5,5-nonafluoro-4-(trifluoromethyl-3-pentanone and 0.01 g of pentafluoropropionic acid is drawn under vacuum in a 100 mL carbon steel cylinder. Stabilizer composition and addition amount is shown in Table 3. Undried common industrial nitrogen is inflated at 20° C. to 25 bar; after sealed, the cylinder is heated to then placed quiescently at 60° C.; then do sampling analysis on day 10, day 30 and day 60, and the results are shown in Table 4.

Examples 11-12

The composition and amount of stabilizers is modulated, the rest of the operation being consistent with Example 10. The composition and amount of stabilizers is shown in Table 3. On day 10, day 30 and day 60 do sampling analysis, and the results are shown in Table 4.

Example 13

105 g of 1,1,1,2,2,4,5,5,5-nonafluoro-4-(trifluoromethyl)-3-pentanone and 0.5 g of water is drawn under vacuum in a 100 mL stainless steel cylinder lined with tetrafluoroethylene. Stabilizer composition and addition amount is shown in Table 3. Undried compressed air is inflated at 20° C. to 25 bar; after sealed, the cylinder is heated to then placed quiescently at 60° C.; then do sampling analysis on day 10, day 30 and day 60, and the results are shown in Table 4.

Example 14

105 g of 1,1,1,2,2,4,5,5,5-nonafluoro-4-(trifluoromethyl)-3-pentanone and 0.5 g of water is drawn under vacuum in a 100 mL stainless steel cylinder lined with tetrafluoroethylene. Stabilizer composition and addition amount is shown in Table 3, Oxygen is inflated at 20° C. to 5 bar, then undried common industrial nitrogen is inflated further to 25 bar; after sealed, the cylinder is heated to then placed quiescently at 60° C.; then do sampling analysis on day 10, day 30 and day 60, and the results are shown in Table 4.

Example 15

The composition and amount of stabilizers is modulated, the rest of the operation being consistent with Example 13. The composition and amount of stabilizers is shown in Table 3. On day 10, day 30 and day 60 do sampling analysis, and the results are shown in Table 4.

Example 16

The composition and amount of stabilizers is modulated, the rest of the operation being consistent with Example 14. The composition and amount of stabilizers is shown in Table 3. On day 10, day 30 and day 60 do sampling analysis, and the results are shown in Table 4.

Example 17

105 g of 1,1,1,2,2,4,5,5,5-nonafluoro-4-(trifluoromethyl)-3-pentanone and 0.5 g of water is drawn under vacuum in a 10 mL pressure-resistant glass test tube. Stabilizer composition and addition amount is shown in Table 3. Undried common industrial nitrogen is inflated at 20° C. to 25 bar; after sealed, the glass test tube is heated to then placed quiescently at 60° C.; then do sampling analysis on day 10, day 30 and day 60, and the results are shown in Table 4.

Examples 18-20

The composition and amount of stabilizers is modulated, the rest of the operation being consistent with Example 17. The composition and amount of stabilizers is shown in Table 3. On day 10, day 30 and day 60 do sampling analysis, and the results are shown in Table 4.

TABLE 3

| Example | Fluorine-containing ketone | Stabilizer Composition | mass ratio | Addition Amount (g/kg fluorine-containing ketone) |
|---|---|---|---|---|
| 1 | 1,1,1,2,2,4,5,5,5-nonafluoro-4-(trifluoromethyl)-3-pentanone | MDHB | 1 | 1 |
| 2 | 1,1,1,2,2,4,5,5,5-nonafluoro-4-(trifluoromethyl)-3-pentanone | TPP | 1 | 1 |
| 3 | 1,1,1,2,2,4,5,5,5-nonafluoro-4-(trifluoromethyl)-3-pentanone | DDBP | 1 | 1 |
| 4 | 1,1,1,2,2,4,5,5,5-nonafluoro-4-(trifluoromethyl)-3-pentanone | TMM | 1 | 1 |
| 5 | 1,1,1,2,2,4,5,5,5-nonafluoro-4-(trifluoromethyl)-3-pentanone | MDHB<br>DBM<br>TPP | 0.3<br>0.3<br>0.4 | 1 |
| 6 | 1,1,1,2,2,4,5,5,5-nonafluoro-4-(trifluoromethyl)-3-pentanone | DBM<br>TPP<br>DDBP<br>TMM | 0.2<br>0.35<br>0.1<br>0.35 | 1 |
| 7 | 1,1,1,2,2,4,5,5,5-nonafluoro-4-(trifluoromethyl)-3-pentanone | DLTDP | 1 | 1 |
| 8 | 1,1,1,2,2,4,5,5,5-nonafluoro-4-(trifluoromethyl)-3-pentanone | MDHB<br>DBM<br>TPP<br>DLTDP | 0.2<br>0.2<br>0.4<br>0.2 | 1 |
| 9 | 1,1,1,2,2,4,5,5,5-nonafluoro-4-(trifluoromethyl)-3-pentanone | DBM<br>TPP<br>DDBP<br>TMM<br>DLTDP | 0.1<br>0.35<br>0.1<br>0.35<br>0.1 | 1 |
| 10 | 1,1,1,2,2,4,5,5,5-nonafluoro-4-(trifluoromethyl)-3-pentanone | NTM<br>PSA | 0.6<br>0.7 | 1.3 |
| 11 | 1,1,1,2,2,4,5,5,5-nonafluoro-4-(trifluoromethyl)-3-pentanone | MDHB<br>DBM<br>TPP<br>DLTDP<br>NTM<br>PSA | 0.2<br>0.2<br>0.4<br>0.2<br>0.2<br>0.1 | 1.3 |
| 12 | 1,1,1,2,2,4,5,5,5-nonafluoro-4-(trifluoromethyl)-3-pentanone | DBM<br>TPP<br>DDBP<br>TMM<br>DLTDP<br>NTM | 0.15<br>0.35<br>0.15<br>0.35<br>0.15<br>0.15 | 1.3 |
| 13 | 1,1,1,2,2,4,5,5,5-nonafluoro-4-(trifluoromethyl)-3-pentanone | EPP<br>DBM | 0.6<br>0.4 | 1 |

TABLE 3-continued

| Example | Fluorine-containing ketone | Stabilizer Composition | mass ratio | Addition Amount (g/kg fluorine-containing ketone) |
|---|---|---|---|---|
| 14 | 1,1,1,2,2,4,5,5,5-nonafluoro-4-(trifluoromethyl)-3-pentanone | BCM | 0.2 | 1 |
|   |   | DBM | 0.4 |   |
|   |   | HDBB | 0.4 |   |
| 15 | 1,1,1,2,2,4,5,5,5-nonafluoro-4-(trifluoromethyl)-3-pentanone | MDHB | 0.15 | 1 |
|   |   | DBM | 0.3 |   |
|   |   | TPP | 0.4 |   |
|   |   | EPP | 0.15 |   |
| 16 | 1,1,1,2,2,4,5,5,5-nonafluoro-4-(trifluoromethyl)-3-pentanone | DBM | 0.15 | 1 |
|   |   | TPP | 0.25 |   |
|   |   | DDBP | 0.1 |   |
|   |   | TMM | 0.3 |   |
|   |   | BCM | 0.1 |   |
|   |   | HDBB | 0.1 |   |
| 17 | 1,1,1,2,2,4,5,5,5-nonafluoro-4-(trifluoromethyl)-3-pentanone | MDHB | 0.2 | 1 |
|   |   | DBM | 0.25 |   |
|   |   | TPP | 0.4 |   |
|   |   | PSA | 0.15 |   |
| 18 | 1,1,1,2,2,4,5,5,5-nonafluoro-4-(trifluoromethyl)-3-pentanone | MDHB | 0.2 | 1 |
|   |   | DBM | 0.25 |   |
|   |   | TPP | 0.4 |   |
|   |   | BCM | 0.15 |   |
| 19 | 1,1,1,2,2,4,5,5,5-nonafluoro-4-(trifluoromethyl)-3-pentanone | MDHB | 0.2 | 1 |
|   |   | DBM | 0.25 |   |
|   |   | TPP | 0.4 |   |
|   |   | DDBP | 0.15 |   |
| 20 | 1,1,1,2,2,4,5,5,5-nonafluoro-4-(trifluoromethyl)-3-pentanone | MDHB | 0.2 | 1 |
|   |   | DBM | 0.25 |   |
|   |   | TPP | 0.4 |   |
|   |   | HDBB | 0.15 |   |

TABLE 4

| | Day 10 | | Day 30 | | Day 60 | |
|---|---|---|---|---|---|---|
| Example | Acidity (mg/kg, calculated by HCl) | Moisture (mg/kg) | Acidity (mg/kg, calculated by HCl) | Moisture (mg/kg) | Acidity (mg/kg, calculated by HCl) | Moisture (mg/kg) |
| Example 1 | 10.14 | 7 | 16.22 | 8 | 20.23 | 9 |
| Example 2 | 8.32 | 6 | 9.02 | 7 | 9.11 | 7 |
| Example 3 | 8.77 | 7 | 9.77 | 7 | 9.98 | 8 |
| Example 4 | 7.25 | 5 | 7.45 | 5 | 8.01 | 6 |
| Example 5 | 8.35 | 4 | 8.56 | 4 | 8.99 | 5 |
| Example 6 | 8.01 | 3 | 8.21 | 3 | 8.65 | 4 |
| Example 7 | 10.11 | 10 | 13.25 | 13 | 16.77 | 20 |
| Example 8 | 8.23 | 3 | 8.86 | 3 | 9.54 | 4 |
| Example 9 | 7.65 | 3 | 7.81 | 3 | 7.98 | 3 |
| Example 10 | 8.78 | 9 | 9.25 | 11 | 11.79 | 20 |
| Example 11 | 8.01 | 3 | 8.07 | 3 | 8.31 | 4 |
| Example 12 | 7.89 | 3 | 7.95 | 3 | 8.35 | 3 |
| Example 13 | 12.39 | 8 | 14.76 | 10 | 19.63 | 13 |
| Example 14 | 10.67 | 8 | 11.35 | 9 | 12.54 | 11 |
| Example 15 | 8.69 | 3 | 8.88 | 4 | 9.01 | 5 |
| Example 16 | 8.14 | 3 | 8.32 | 4 | 8.69 | 4 |
| Example 17 | 8.44 | 3 | 8.92 | 4 | 9.17 | 4 |
| Example 18 | 8.45 | 3 | 8.77 | 4 | 8.78 | 4 |
| Example 19 | 8.31 | 3 | 8.71 | 4 | 9.25 | 4 |
| Example 20 | 8.02 | 3 | 8.54 | 4 | 8.89 | 4 |

Example 21

105 g of fluorine-containing ketone composition is drawn under vacuum in a 100 mL stainless steel cylinder lined with tetrafluoroethylene. The name of the fluorine-containing ketone, the stabilizer's composition and addition amount is shown in Table 5. Dried high purity nitrogen (moisture<10 ppm) is inflated at 20° C. to 25 bar; after sealed, the cylinder is heated to then placed quiescently at 60° C.; Then do sampling analysis on day 30 and day 60, and the results are shown in Table 6.

Examples 22-39

The composition and amount of stabilizers is modulated, the rest of the operation being consistent with Example 21. The composition and amount of stabilizers is shown in Table 5. On day 30 and day 60 do sampling analysis, and the results are shown in Table 6.

Examples 40-45

The composition and amount of fluorine-containing ketones and stabilizers is modulated, the rest of the operation being consistent with Example 21, The composition and amount of fluorine-containing ketones and stabilizers is shown in Table 5. On day 30 and day 60 do sampling analysis, and the results are shown in Table 6.

TABLE 5

| Example | Fluorine-containing ketone | Stabilizer Composition | Mass Ratio | Addition Amount (g/kg fluorine-containing ketone) |
|---|---|---|---|---|
| 21 | 2-trifluoromethyl-1,1,1,2,4,4,5,5,5-nonafluoro-3-pentanone | DBM | 0.1 | 1 |
|  |  | TPP | 0.4 |  |
|  |  | DDBP | 0.1 |  |
|  |  | TEM | 0.4 |  |
| 22 | 1,1,1,3,3,3-hexafluoro-acetone | DBM | 0.2 | 1.3 |
|  |  | TMP | 0.45 |  |
|  |  | DDBP | 0.25 |  |
|  |  | TMM | 0.4 |  |
| 23 | 1,1,1,3,3,4,4-octafluoro-2-butanone | DBM | 0.2 | 1 |
|  |  | TMP | 0.35 |  |
|  |  | DDBP | 0.1 |  |
|  |  | TMM | 0.35 |  |
| 24 | 3-trifluoromethyl-1,1,1,3,4,4,4-heptafluoro-2-butanone | DBM | 0.2 | 1 |
|  |  | TMP | 0.35 |  |
|  |  | DDBP | 0.1 |  |
|  |  | TMM | 0.35 |  |
| 25 | 4-trifluoromethyl-1,1,1,3,3,4,5,5,5-nonafluoro-2-pentanone | DBM | 0.2 | 1 |
|  |  | TMP | 0.35 |  |
|  |  | DDBP | 0.1 |  |
|  |  | TMM | 0.35 |  |
| 26 | 3-trifluoromethyl-1,1,1,3,4,4,4-heptafluoro-2-butanone | DBM | 0.2 | 1 |
|  |  | TDP | 0.3 |  |
|  |  | DDBP | 0.1 |  |
|  |  | TCEM | 0.3 |  |
|  |  | EPCH | 0.1 |  |
| 27 | 3-trifluoromethyl-3-bromo-1,1,1,4-tetrafluoro-2-butanone | MDHB | 0.3 | 1 |
|  |  | DBM | 0.3 |  |
|  |  | TPP | 0.4 |  |
| 28 | 3-bromo-1,1,1,3,4,4,4-heptafluoro-2-butanone | MDHB | 0.3 | 1 |
|  |  | DBM | 0.3 |  |
|  |  | TPP | 0.4 |  |
| 29 | 1,1,1,2,2,4,4,5,5,5-decafluoro-2-pentanone | DBM | 0.2 | 1 |
|  |  | TPP | 0.3 |  |
|  |  | DDBP | 0.1 |  |
|  |  | TEM | 0.4 |  |
| 30 | 2-trifluoromethyl-3-bromo-1,4,4,5,5,5-hexafluoro-3-pentanone | MDHB | 0.3 | 1 |
|  |  | DBM | 0.3 |  |
|  |  | TDP | 0.4 |  |
| 31 | 2-bromo-1,1,1,2,4,4,5,5,5-nonafluoro-2-pentanone | TBC | 0.15 | 1 |
|  |  | DBM | 0.3 |  |
|  |  | TDP | 0.4 |  |
|  |  | HDBB | 0.15 |  |
| 32 | 2-trifluoromethyl-1,1,1,2,4,4,5,5,6,6,6-undecafluoro-3-hexanone | DBM | 0.2 | 1 |
|  |  | TBP | 0.35 |  |
|  |  | DDBP | 0.1 |  |
|  |  | TPM | 0.35 |  |
| 33 | 2-trifluoromethyl-1,1,1,2,3,3,5,5,6,6,7,7,7-tridecafluoro-4-heptanone | DBM | 0.2 | 1 |
|  |  | TBP | 0.35 |  |
|  |  | DDBP | 0.1 |  |
|  |  | TPM | 0.35 |  |
| 34 | 2-trifluoromethyl-3-bromo-1,4,4,5,5,6,6,6-octafluoro-3-hexanone | MDHB | 0.25 | 1 |
|  |  | DBM | 0.25 |  |
|  |  | TDP | 0.4 |  |
|  |  | BCM | 0.1 |  |

TABLE 5-continued

| Example | Fluorine-containing ketone | Stabilizer Composition | Mass Ratio | Addition Amount (g/kg fluorine-containing ketone) |
|---|---|---|---|---|
| 35 | 2-bromo-1,1,1,2,4,4,5,5,6,6,6-undecafluoro-3-hexanone | MDHB<br>DBM<br>TDP<br>BCM | 0.25<br>0.25<br>0.4<br>0.1 | 1 |
| 36 | 2,4-bis(trifluoromethyl)-1,1,1,2,4,5,5,5-octafluoro-3-pentanone | DBM<br>TBP<br>DDBP<br>TPM | 0.2<br>0.35<br>0.1<br>0.35 | 1 |
| 37 | 2,5-bis(trifluoromethyl)-1,1,1,2,4,4,4,5,6,6,6-decafluoro-3-hexanone | DBM<br>TBP<br>DDBP<br>TPM | 0.3<br>0.3<br>0.4<br>  | 1 |
| 38 | 2,4-bis(trifluoromethyl)-2-bromo-1,4,5,5,5-pentafluoro-3-pentanone | MDHB<br>DBM<br>TDP<br>PSA | 0.2<br>0.3<br>0.4<br>0.1 | 1 |
| 39 | 2-trifluoromethyl-4-bromo-1,1,1,2,4,5,5-heptafluoro-3-pentanone | MDHB<br>DBM<br>TDP<br>PSA | 0.15<br>0.35<br>0.4<br>0.1 | 1 |
| 40 | 2-trifluoromethyl-1,1,1,2,4,4,5,5,5-nonafluoro-3-pentanone (40 wt %), 3-trifluoromethyl-1,1,1,3,4,4,4-heptafluoro-2-butanone (60 wt %) | DBM<br>TPP<br>DDBP<br>TEM | 0.1<br>0.3<br>0.1<br>0.5 | 1 |
| 41 | 2-trifluoromethyl-1,1,1,2,4,4,5,5,5-nonafluoro-3-pentanone (30 wt %), 2-trifluoromethyl-1,1,1,2,4,4,5,5,6,6,6-undecafluoro-3-hexanone (70 wt %) | DBM<br>TPP<br>DDBP<br>TEM | 0.1<br>0.35<br>0.1<br>0.45 | 1 |
| 42 | 2-trifluoromethyl-1,1,1,2,4,4,5,5,5-nonafluoro-3-pentanone (50 wt %), 2,4-bis(trifluoromethyl)-1,1,1,2,4,5,5,5-octafluoro-3-pentanone (50 wt %) | DBM<br>TPP<br>DDBP<br>TEM | 0.1<br>0.4<br>0.1<br>0.4 | 1 |
| 43 | 2-trifluoromethyl-1,1,1,2,4,4,5,5,6,6,6-nonafluoro-3-hexanone (35 wt %), 2,4-bis(trifluoromethyl)-1,1,1,2,4,5,5,5-octafluoro-3-pentanone (65 wt %) | DBM<br>TPP<br>DDBP<br>TEM | 0.05<br>0.05<br>0.1<br>0.4 | 1 |
| 44 | trifluoromethyl-1,1,1,2,4,4,5,5,5-nonafluoro-3-pentanone (40 wt %), 2-trifluoromethyl-1,1,1,2,4,4,5,5,6,6,6-undecafluoro-3-hexanone (21 wt %), 2,4-bis(trifluoromethyl)-1,1,1,2,4,5,5,5-octafluoro-3-pentanone (39 wt %) | DBM<br>TPP<br>DDBP<br>TEM | 0.05<br>0.3<br>0.1<br>0.55 | 1 |
| 45 | 2-trifluoromethyl-1,1,1,2,4,4,5,5,5-nonafluoro-3-pentanone (20 wt %), 3-trifluoromethyl-1,1,1,3,4,4,4-heptafluoro-2-butanone (10 wt %), 2-trifluoromethyl-1,1,1,2,4,4,5,5,6,6,6-undecafluoro-3-hexanone (21 wt %), 2,4-bis(trifluoromethyl)-1,1,1,2,4,5,5,5-octafluoro-3-pentanone | DBM<br>TPP<br>DDBP<br>TEM | 0.1<br>0.5<br>0.1<br>0.3 | 1 |

TABLE 6

| | Day 30 | | Day 60 | |
|---|---|---|---|---|
| Example | Acidity (mg/kg, calculated by HCl) | Moisture (mg/kg) | Acidity (mg/kg, calculated by HCl) | Moisture (mg/kg) |
| Example 21 | <8 | <3 | <8 | <3 |
| Example 22 | <8 | <8 | <8 | <3 |
| Example 23 | <8 | <3 | <8 | <3 |
| Example 24 | <8 | <3 | <8 | <3 |
| Example 25 | <8 | <3 | <8 | <3 |
| Example 26 | <8 | <3 | <8 | <3 |
| Example 27 | <8 | <3 | <8 | <3 |
| Example 28 | <8 | <3 | <8 | <3 |
| Example 29 | <8 | <3 | <8 | <3 |
| Example 30 | <8 | <3 | <8 | <3 |
| Example 31 | <8 | <3 | <8 | <3 |
| Example 32 | <8 | <3 | <8 | <3 |
| Example 33 | <8 | <3 | <8 | <3 |
| Example 34 | <8 | <3 | <8 | <3 |
| Example 35 | <8 | <3 | <8 | <3 |
| Example 36 | <8 | <3 | <8 | <3 |
| Example 37 | <8 | <3 | <8 | <3 |
| Example 38 | <8 | <3 | <8 | <3 |
| Example 39 | <8 | <3 | <8 | <3 |
| Example 40 | <8 | <3 | <8 | <3 |
| Example 41 | <8 | <3 | <8 | <3 |
| Example 42 | <8 | <3 | <8 | <3 |
| Example 43 | <8 | <3 | <8 | <3 |
| Example 44 | <8 | <3 | <8 | <3 |
| Example 45 | <8 | <3 | <8 | <3 |

Comparative Example 1

105 g of 1,1,1,2,2,4,5,5,5-nonafluoro-4-(trifluoromethyl)-3-pentanone is drawn under vacuum in a 100 mL stainless steel autoclave lined with tetrafluoroethylene. Undried common industrial nitrogen is inflated at 20° C. to 25 bar; after sealed, the autoclave is placed quiescently at room temperature; then do sampling analysis on day 10, day 30 and day 60, and the results are shown in Table 7.

Comparative Example 2

105 g of 1,1,1,2,2,4,5,5,5-nonafluoro-4-(trifluoromethyl)-3-pentanone is drawn under vacuum in a 100 mL stainless steel cylinder lined with tetrafluoroethylene. Undried common industrial nitrogen is inflated at 20° C. to 25 bar; after sealed, the cylinder is heated to then placed quiescently at 60° C.; then do sampling analysis on day 10, day 30 and day 60, and the results are shown in Table 7.

Comparative Example 3

105 g of 1,1,1,2,2,4,5,5,5-nonafluoro-4-(trifluoromethyl)-3-pentanone and 0.5 g of water is drawn under vacuum in a 100 mL stainless steel cylinder lined with tetrafluoroethylene. Undried common industrial nitrogen is inflated at 20° C. to 25 bar; after sealed, the cylinder is heated to then placed quiescently at 60° C.; then do sampling analysis on day 10, day 30 and day 60, and the results are shown in Table 7.

Comparative Example 4

105 g of 1,1,1,2,2,4,5,5,5-nonafluoro-4-(trifluoromethyl)-3-pentanone is drawn under vacuum in a 100 mL carbon steel cylinder. Undried common industrial nitrogen is inflated at 20° C. to 25 bar; after sealed, the cylinder is heated to then placed quiescently at 60° C.; then do sampling analysis on day 10, day 30 and day 60, and the results are shown in Table 7.

Comparative Example 5

105 g 1,1,1,2,2,4,5,5,5-nonafluoro-4-(trifluoromethyl)-3-pentanone and 0.01 g of pentafluoropropionic acid is drawn under vacuum in a 100 mL carbon steel cylinder. Undried common industrial nitrogen is inflated at 20° C. to 25 bar; after sealed, the cylinder is heated to then placed quiescently at 60° C.; then do sampling analysis on day 10, day 30 and day 60, and the results are shown in Table 7.

Comparative Example 6

105 g of 1,1,1,2,2,4,5,5,5-nonafluoro-4-(trifluoromethyl)-3-pentanone and 0.5 g of water is drawn under vacuum in a 100 mL stainless steel cylinder lined with tetrafluoroethylene. Undried compressed air is inflated at 20° C. to 25 bar; after sealed, the cylinder is heated to then placed quiescently at 60° C.; then do sampling analysis on day 10, day 30 and day 60, and the results are shown in Table 7.

Comparative Example 7

105 g of 1,1,1,2,2,4,5,5,5-nonafluoro-4-(trifluoromethyl)-3-pentanone and 0.5 g of water is drawn under vacuum in a 100 mL stainless steel cylinder lined with tetrafluoroethylene. Oxygen is inflated at 20° C. to 5 bar, then undried common industrial nitrogen is inflated:further to 25 bar; after sealed, the cylinder is heated to then placed quiescently at 60° C.; then do sampling analysis on day 10, day 30 and day 60, and the results are shown in Table 7.

Comparative Example 8

105 g of 1,1,1,2,2,4,5,5,5-nonafluoro-4-(trifluoromethyl)-3-pentanone and 0.5 g of water is drawn under vacuum in a 10 mL pressure-resistant glass test tube. Undried common industrial nitrogen is inflated at 20° C. to 25 bar; after sealed, the glass test tube is heated to then placed quiescently at 60° C.; then do sampling analysis on day 10, day 30 and day 60, and the results are shown in Table 7.

TABLE 7

| Comparative Example | Day 10 | | Day 30 | | Day 60 | |
|---|---|---|---|---|---|---|
| | Acidity (mg/kg, calculated based on HCl) | Moisture (mg/kg) | Acidity (mg/kg, calculated based on HCl) | Moisture (mg/kg) | Acidity (mg/kg, calculated based on HCl) | Moisture (mg/kg) |
| Comparative Example 1 | 15 | 4 | 26 | 10 | 36 | 22 |
| Comparative Example 2 | 12 | 9 | 18 | 25 | 22 | 40 |
| Comparative Example 3 | 35 | 23 | 38 | 40 | 45 | 55 |
| Comparative Example 4 | 15 | 37 | 36 | 60 | 60 | 95 |
| Comparative Example 5 | 55 | 131 | 78 | 152 | 150 | 230 |
| Comparative Example 6 | 53 | 37 | 72 | 55 | 88 | 79 |
| Comparative Example 7 | 37 | 30 | 41 | 50 | 50 | 85 |
| Comparative Example 8 | 36 | 45 | 42 | 60 | 53 | 83 |

What is claimed is:

1. A composition, consisting of:
   (A) at least one fluorine-containing ketone; and
   (B) an effective amount of a stabilizer, which is at least one selected from the group consisting of an epoxy compound, a β-diketone compound, a salicylate compound, a cinnamate compound, a hydroxybenzophenone compound, a hydroxybenzoic acid compound, an alkoxymethane compound and an organic thio compound, wherein a mass ratio of the stabilizer to the fluorine-containing ketone ranges from 0.1:1000 to 50:1000.

2. The composition according to claim 1, wherein the fluorine-containing ketone has the following molecular structure:

$$R^1_f-C(=O)-R^2_f$$

wherein, $R^1_f$ and $R^2_f$ are independently selected from $C_aH_bF_cCl_dBr_e$, wherein a is an integer selected from 1 to 7, b, d and e are independent integers selected from 0 to 15, c is an integer selected from 1 to 15, and $b+c+d+e \leq 2a+1$.

3. The composition according to claim 2, wherein the fluorine-containing ketone is at least one selected from the group consisting of the following compounds:
CF$_3$C(=O)CF$_3$, CF$_3$C(=O)CF$_2$CF$_3$, CF$_3$C(=O)CF$_2$CF$_2$CF$_3$, CF$_3$C(=O)CF(CF$_3$)$_2$, CF$_3$C(=O)CF$_2$CF$_2$CF$_2$CF$_3$, CF$_3$C(=O)CF$_2$CF(CF$_3$)$_2$, CF$_3$C(=O)CF(CF$_3$)CF$_2$CF$_3$, CF$_3$C(=O)CF$_2$CF$_2$CF$_2$CF$_2$CF$_3$, CF$_3$C(=O)CF(CF$_3$)CF$_2$CF$_2$CF$_3$, CF$_3$C(=O)CF(CF$_2$CF$_3$)$_2$, CF$_3$C(=O)CF$_2$CF$_2$CF$_2$CF$_2$CF$_3$, CF$_3$C(=O)CF(CF$_3$)CF$_2$CF$_2$CF$_2$CF$_3$, CF$_3$C(=O)CF(CF$_2$CF$_3$)CF$_2$CF$_2$CF$_3$, CF$_3$C(=O)C(CF$_3$)$_2$CF$_2$CF$_2$CF$_3$CF$_3$C(=O)CF$_2$CF(CF$_3$)CF$_2$CF$_2$CF$_3$, CF$_3$C(=O)CF(i—C$_3$F$_7$)CF$_2$CF$_3$, CF$_3$C(=O)CF(CF$_3$)CF$_2$CF(CF$_3$)$_2$, CF$_3$C(=O)CF$_2$CF$_2$CF$_2$CF$_2$CF$_2$CF$_3$, CF$_3$C(=O)CF(CF$_3$) CF$_2$CF$_2$CF$_2$CF$_2$CF$_3$, CF$_3$C(=O)CF$_2$CF$_2$CF=CF$_2$, CF$_3$C(=O)CF(CF$_3$)CF=CF$_2$, CF$_3$C(=O)CH(CF$_3$)CHFCF$_3$, CF$_3$C(=O)CH$_2$CFBrCF$_3$, CF$_3$C(=O)CBr(CF$_3$)CH$_2$F, CF$_3$C(=O)CHBrCHFCF$_3$, CF$_3$C(=O)CH(CF$_3$)CHFBr, CF$_3$C(=O)CH$_2$CFClCF$_3$, CF$_3$C(=O)CCl(CF$_3$)CH$_2$F, CF$_3$C(=O)CHClCHFCF$_3$, CF$_3$C(=O)CH(CF$_3$)CHFCl, CF$_3$C(=O)CH$_2$CHFCF$_3$, CF$_3$C(=O)CH(CF$_3$)CH$_2$F, CF$_3$C(=O)CH$_2$CF$_2$CF$_3$, CF$_3$C(=O)CF(CF$_3$)CH$_2$F, CF$_3$C(=O)CHFCHFCF$_3$, CF$_3$C(=O)CH(CF$_3$)CHF$_2$, CF$_3$C(=O)CHFCF$_3$, CF$_3$C(=O)CF$_2$CHF$_2$, CF$_3$C(=O)CCIFCF$_3$, CF$_3$C(=O)CF$_2$CF$_2$Cl, CF$_3$C(=O)CBrFCF$_3$, CF$_3$C(=O)CF$_2$CF$_2$Br, CF$_3$CF$_2$C(=O)CF$_2$CF$_3$, CF$_3$CF$_2$C(=O)CF$_2$CF$_2$CF$_3$, CF$_3$CF$_2$C(=O)CF(CF$_3$)$_2$, CF$_3$CF$_2$C(=O)CF$_2$CF$_2$CF$_2$CF$_3$, CF$_3$CF$_2$C(=O)CF$_2$CF(CF$_3$)$_2$, CF$_3$CF$_2$C(=O)CF(CF$_3$)CF$_2$CF$_3$, CF$_3$CF$_2$C(=O)CF$_2$CF$_2$CF$_2$CF$_2$CF$_3$, CF$_3$CF$_2$C(=O)CF(CF$_2$CF$_3$)CF$_2$CF$_3$, CF$_3$CF$_2$C(=O)CF(CF$_3$)CF$_2$CF$_2$CF$_3$, CF$_3$CF$_2$C(=O)CF(CF$_2$CF$_3$)$_2$, CF$_3$CF$_2$C(=O)CF$_2$CF$_2$CF$_2$CF$_2$CF$_2$CF$_3$, CF$_3$CF$_2$C(=O)CF(CF$_3$)CF$_2$CF$_2$CF$_2$CF$_3$, CF$_3$CF$_2$C(=O)CFCF$_2$CF$_3$, CF$_3$CF$_2$C(=O)C(CF$_3$)$_2$CF$_2$CF$_2$CF$_3$, CF$_3$CF$_2$C(=O)CF$_2$CF(CF$_3$)CF$_2$CF$_2$CF$_3$, CF$_3$CF$_2$C(=O)CF(i—C$_3$F$_7$)CF$_2$CF$_3$, CF$_3$CF$_2$C(=O)CF(CF$_3$)CF$_2$CF(CF$_3$)$_2$, CF$_3$CF$_2$C(=O)CF$_2$CF$_2$CF$_2$CF$_2$CF$_2$CF$_3$, CF$_3$CF$_2$C(=O)CF(CF$_3$)CF$_2$CF$_2$CF$_2$CF$_3$, CF$_3$CF$_2$C(=O)CF$_2$CF$_2$CF=CF$_2$, CF$_3$CF$_2$C(=O)CF(CF$_3$)CF=CF$_2$, CF$_3$CF$_2$C(=O)CH(CF$_3$)CHFCF$_3$, CF$_3$CF$_2$C(=O)CH$_2$CFBrCF$_3$, CF$_3$CF$_2$C(=O)CBr(CF$_3$)CH$_2$F, CF$_3$CF$_2$C(=O)CHBrCHFCF$_3$, CF$_3$CF$_2$C(=O)CH(CF$_3$)CHFBr, CF$_3$CF$_2$C(=O)CH$_2$CFClCF$_3$, CF$_3$CF$_2$C(=O)CCl(CF$_3$)CH$_2$F, CF$_3$CF$_2$C(=O)CHClCHFCF$_3$, CF$_3$CF$_2$C(=O)CH(CF$_3$)CHFCl, CF$_3$CF$_2$C(=O)CH$_2$CHFCF$_3$, CF$_3$CF$_2$C(=O)CH(CF$_3$)CH$_2$F, CF$_3$CF$_2$C(=O)CH$_2$CF$_2$CF$_3$, CF$_3$CF$_2$C(=O)CF(CF$_3$)CH$_2$F, CF$_3$CF$_2$C(=O)CHFCHFCF$_3$, CF$_3$CF$_2$C(=O)CH(CF$_3$)CHF$_2$, CF$_3$CF$_2$C(=O)CHFCF$_3$, CF$_3$CF$_2$C(=O)CF$_2$CHF$_2$, CF$_3$CF$_2$C(=O)CCIFCF$_3$, CF$_3$CF$_2$C(=O)CF$_2$CF$_2$Cl, CF$_3$CF$_2$C(=O)CBrFCF$_3$, CF$_3$CF$_2$C(=O)CF$_2$CF$_2$Br, (CF$_3$)$_2$CFC(=O)CF(CF$_3$)$_2$, (CF$_3$)$_2$CFC(=O)CF$_2$CF$_2$CF$_3$, (CF$_3$)$_2$CFC(=O)CF$_2$CF(CF$_3$)$_2$, (CF$_3$)$_2$CFC(=O)CF(CF$_3$)CF$_2$CF$_3$, (CF$_3$)$_2$CFC(=O)CF$_2$CF$_2$CF$_2$CF$_3$, (CF$_3$)$_2$CFC(=O)CF(CF$_3$)CF$_2$CF$_2$CF$_3$, (CF$_3$)$_2$CFC(=O)CF(CF$_2$CF$_3$)$_2$, (CF$_3$)$_2$CFC(=O)CF$_2$CF$_2$CF$_2$CF$_2$CF$_3$, (CF$_3$)$_2$CFC(=O)CF(CF$_3$)CF$_2$CF$_2$CF$_2$CF$_3$, (CF$_3$)$_2$CFC(=O)CF(CF$_2$CF$_3$)CF$_2$CF$_2$CF$_3$, (CF$_3$)$_2$CFC(=O)C(CF$_3$)$_2$CF$_2$CF$_2$CF$_3$, (CF$_3$)$_2$CFC(=O)CF$_2$CF(CF$_3$)CF$_2$CF$_2$CF$_3$, (CF$_3$)$_2$CFC(=O)CF(i—C$_3$F$_7$)CF$_2$CF$_3$, (CF$_3$)$_2$CFC(=O)CF(CF$_3$)CF$_2$CF(CF$_3$)$_2$, (CF$_3$)$_2$CFC(=O)CF$_2$CF$_2$CF$_2$CF$_2$CF$_2$CF$_3$, (CF$_3$)$_2$CFC(=O)CF(CF$_3$)CF$_2$CF$_2$CF$_2$CF$_3$, (CF$_3$)$_2$CFC(=O)CF$_2$CF$_2$CF=CF$_2$, (CF$_3$)$_2$CFC(=O)CF(CF$_3$)CF=CF$_2$, (CF$_3$)$_2$CFC(=O)CH(CF$_3$)CHFCF$_3$, (CF$_3$)$_2$CFC(=O)CH$_2$CFBrCF$_3$, (CF$_3$)$_2$CFC(=O)CBr(CF$_3$)CH$_2$F, (CF$_3$)$_2$CFC(=O)CHBrCHFCF$_3$, (CF$_3$)$_2$CFC(=O)CH(CF$_3$)CHFBr, (CF$_3$)$_2$CFC(=O)CH$_2$CFClCF$_3$, (CF$_3$)$_2$CFC(=O)CCl(CF$_3$)CH$_2$F, (CF$_3$)$_2$CFC(=O)CHClCHFCF$_3$, (CF$_3$)$_2$CFC(=O)CH(CF$_3$)CHFCl, (CF$_3$)$_2$CFC(=O)CH$_2$CHFCF$_3$, (CF$_3$)$_2$CFC(=O)CH(CF$_3$)CH$_2$F, (CF$_3$)$_2$CFC(=O)CH$_2$CF$_2$CF$_3$, (CF$_3$)$_2$CFC(=O)CF(CF$_3$)CH$_2$F, (CF$_3$)$_2$CFC(=O)CHFCHFCF$_3$, (CF$_3$)$_2$CFC(=O)CH(CF$_3$)CHF$_2$, (CF$_3$)$_2$CFC(=O)CHFCF$_3$, (CF$_3$)$_2$CFC(=O)CF$_2$CHF$_2$, (CF$_3$)$_2$CFC(=O)CCIFCF$_3$, (CF$_3$)$_2$CFC(=O)CF$_2$CF$_2$Cl, (CF$_3$)$_2$CFC(=O)CBrFCF$_3$, (CF$_3$)$_2$CFC(=O)CF$_2$CF$_2$Br.

4. The composition according to claim 3, wherein the fluorine-containing ketone is at least one selected from the group consisting of the following compounds:
CF$_3$C(=O)CF$_3$, CF$_3$C(=O)CF$_2$CF$_3$, CF$_3$C(=O)CF(CF$_3$)$_2$, CF$_3$C(=O)CF$_2$CF(CF$_3$)$_2$, CF$_3$C(=O)CF(CF$_3$)

$CF_2CF_3$, $CF_3C(=O)CF(CF_3)CF_2CF_2CF_3$, $CF_3C(=O)CF(CF_2CF_3)_2$, $CF_3C(=O)CF(CF_3)CF_2CF_2CF_3$, $CF_3C(=O)CF(CF_2CF_3)CF_2CF_2CF_3$, $CF_3C(=O)C(CF_3)_2CF_2CF_2CF_3$, $CF_3C(=O)CF(i-C_3F_7)CF_2CF_3$, $CF_3C(=O)CF(CF_3)CF_2CF_2CF_2CF_3$, $CF_3C(=O)CF_2CF_2CF=CF_2$, $CF_3C(=O)CF(CF_3)CF=CF_2$, $CF_3C(=O)CH(CF_3)CHFCF_3$, $CF_3C(=O)CH_2CFBrCF_3$, $CF_3C(=O)CBr(CF_3)CH_2F$, $CF_3C(=O)CHBrCHFCF_3$, $CF_3C(=O)CH(CF_3)CHFBr$, $CF_3C(=O)CH_2CFClCF_3$, $CF_3C(=O)CCl(CF_3)CH_2F$, $CF_3C(=O)CHClCHFCF_3$, $CF_3C(=O)CH(CF_3)CHFCl$, $CF_3C(=O)CH(CF_3)CH_2F$, $CF_3C(=O)CF(CF_3)CH_2F$, $CF_3C(=O)CH(CF_3)CHF_2$, $CF_3C(=O)CHFCF_3$, $CF_3C(=O)CF_2CHF_2$, $CF_3C(=O)CClFCF_3$, $CF_3C(=O)CF_2CF_2Cl$, $CF_3C(=O)CBrFCF_3$, $CF_3C(=O)CF_2CF_2Br$, $CF_3CF_2C(=O)CF_2CF_3$, $CF_3CF_2C(=O)CF(CF_3)_2$, $CF_3CF_2C(=O)CF_2CF(CF_3)_2$, $CF_3CF_2C(=O)CF(CF_3)CF_2CF_3$, $CF_3CF_2C(=O)CF(CF_3)CF_2CF_3$, $CF_3CF_2C(=O)CF(CF_2CF_3)_2$, $CF_3CF_2C(=O)CF(CF_3)CF_2CF_2CF_3$, $CF_3CF_2C(=O)CF(CF_2CF_3)CF_2CF_2CF_3$, $CF_3CF_2C(=O)C(CF_3)_2CF_2CF_2CF_3$, $CF_3CF_2C(=O)CF(i-C_3F_7)CF_2CF_3$, $CF_3CF_2C(=O)CF(CF_3)CF_2CF_2CF_2CF_3$, $CF_3CF_2C(=O)CF_2CF_2CF=CF_2$, $CF_3CF_2C(=O)CF(CF_3)CF=CF_2$, $CF_3CF_2C(=O)CH(CF_3)CHFCF_3$, $CF_3CF_2C(=O)CH_2CFBrCF_3$, $CF_3CF_2C(=O)CBr(CF_3)CH_2F$, $CF_3CF_2C(=O)CHBrCHFCF_3$, $F_3CF_2C(=O)CH(CF_3)CHFBr$, $CF_3CF_2C(=O)CH_2CFClCF_3$, $CF_3CF_2C(=O)CCl(CF_3)CH_2F$, $CF_3CF_2C(=O)CHClCHFCF_3$, $CF_3CF_2C(=O)CH(CF_3)CHFCl$, $CF_3CF_2C(=O)CH(CF_3)CH_2F$, $CF_3CF_2C(=O)CF(CF_3)CH_2F$, $CF_3CF_2C(=O)CH(CF_3)CHF_2$, $CF_3CF_2C(=O)CHFCF_3$, $CF_3CF_2C(=O)CF_2CHF_2$, $CF_3CF_2C(=O)CClFCF_3$, $CF_3CF_2C(=O)CF_2CF_2Cl$, $CF_3CF_2C(=O)CBrFCF_3$, $CF_3CF_2C(=O)CF_2CF_2Br$, $CF_3CF_2CF_2C(=O)CF(CF_3)_2$, $CF_3CF_2CF_2C(=O)CF_2CF(CF_3)_2$, $CF_3CF_2CF_2C(=O)CF(CF_3)CF_2CF_3$, $CF_3CF_2CF_2C(=O)CF(CF_3)CF_2CF_2CF_3$, $CF_3CF_2CF_2C(=O)CF(CF_2CF_3)_2$, $CF_3CF_2CF_2C(=O)CF(CF_3)CF_2CF_2CF_3$, $CF_3CF_2CF_2C(=O)CF(CF_2CF_3)CF_2CF_2CF_3$, $CF_3CF_2CF_2C(=O)C(CF_3)_2CF_2CF_2CF_3$, $CF_3CF_2CF_2C(=O)CF(i-C_3F_7)CF_2CF_3$, $CF_3CF_2CF_2C(=O)CF(CF_3)CF_2CF_2CF_2CF_3$, $CF_3CF_2CF_2C(=O)CF_2CF_2CF=CF_2$, $CF_3CF_2CF_2C(=O)CF(CF_3)CF=CF_2$, $CF_3CF_2CF_2C(=O)CH(CF_3)CHFCF_3$, $CF_3CF_2CF_2C(=O)CH_2CFBrCF_3$, $CF_3CF_2CF_2C(=O)CBr(CF_3)CH_2F$, $CF_3CF_2CF_2C(=O)CHBrCHFCF_3$, $CF_3CF_2CF_2C(=O)CH(CF_3)CHFBr$, $CF_3CF_2CF_2C(=O)CH_2CFClCF_3$, $CF_3CF_2CF_2C(=O)CCl(CF_3)CH_2F$, $CF_3CF_2CF_2C(=O)CHClCHFCF_3$, $CF_3CF_2CF_2C(=O)CH(CF_3)CHFCl$, $CF_3CF_2CF_2C(=O)CH(CF_3)CH_2F$, $CF_3CF_2CF_2C(=O)CF(CF_3)CH_2F$, $CF_3CF_2CF_2C(=O)CH(CF_3)CHF_2$, $CF_3CF_2CF_2C(=O)CHFCF_3$, $CF_3CF_2CF_2C(=O)CF_2CHF_2$, $CF_3CF_2CF_2C(=O)CClFCF_3$, $CF_3CF_2CF_2C(=O)CF_2CF_2Cl$, $CF_3CF_2CF_2C(=O)CBrFCF_3$, $CF_3CF_2CF_2C(=O)CF_2CF_2Br$, $(CF_3)_2CFC(=O)CF(CF_3)_2$, $(CF_3)_2CFC(=O)CF_2CF(CF_3)_2$, $(CF_3)_2CFC(=O)CF(CF_3)CF_2CF_3$, $(CF_3)_2CFC(=O)CF(CF_3)CF_2CF_2CF_3$, $(CF_3)_2CFC(=O)CF(CF_2CF_3)_2$, $(CF_3)_2CFC(=O)CF(CF_3)CF_2CF_2CF_3$, $(CF_3)_2CFC(=O)CF(CF_2CF_3)CF_2CF_2CF_3$, $(CF_3)_2CFC(=O)C(CF_3)_2CF_2CF_2CF_3$, $(CF_3)_2CFC(=O)CF(i-C_3F_7)CF_2CF_3$, $(CF_3)_2CFC(=O)CF(CF_3)CF_2CF_2CF_2CF_3$, $(CF_3)_2CFC(=O)CF_2CF_2CF=CF_2$, $(CF_3)_2CFC(=O)CF(CF_3)CF=CF_2$, $(CF_3)_2CFC(=O)CH(CF_3)CHFCF_3$, $(CF_3)_2CFC(=O)CH_2CFBrCF_3$, $(CF_3)_2CFC(=O)CBr(CF_3)CH_2F$, $(CF_3)_2CFC(=O)CHBrCHFCF_3$, $(CF_3)_2CFC(=O)CH(CF_3)CHFBr$, $(CF_3)_2CFC(=O)CH_2CFClCF_3$, $(CF_3)_2CFC(=O)CCl(CF_3)CH_2F$, $(CF_3)_2CFC(=O)CHClCHFCF_3$, $(CF_3)_2CFC(=O)CH(CF_3)CHFCl$, $(CF_3)_2CFC(=O)CH(CF_3)CH_2F$, $(CF_3)_2CFC(=O)CF(CF_3)CH_2F$, $(CF_3)_2CFC(=O)CH(CF_3)CHF_2$, $(CF_3)_2CFC(=O)CHFCF_3$, $(CF_3)_2CFC(=O)CF_2CHF_2$, $(CF_3)_2CFC(=O)CClFCF_3$, $(CF_3)_2CFC(=O)CF_2CF_2Cl$, $(CF_3)_2CFC(=O)CBrFCF_3$, $(CF_3)_2CFC(=O)CF_2CF_2Br$.

5. The composition according to claim 4, wherein the fluorine-containing ketone is at least one selected from the group consisting of the following compounds:

$CF_3C(=O)CF_3$, $CF_3C(=O)CF_2CF_3$, $CF_3C(=O)CF(CF_3)_2$, $CF_3C(=O)CF_2CF(CF_3)_2$, $CF_3C(=O)CF(CF_2CF_3)_2$, $CF_3C(=O)CF(CF_2CF_3)CF_2CF_2CF_3$, $CF_3C(=O)CF_2CF_2CF=CF_2$, $CF_3C(=O)CF(CF_3)CF=CF_2$, $CF_3C(=O)CH(CF_3)CHFCF_3$, $CF_3C(=O)CH_2CFBrCF_3$, $CF_3C(=O)CBr(CF_3)CH_2F$, $CF_3C(=O)CHBrCHFCF_3$, $CF_3C(=O)CCl(CF_3)CH_2F$, $CF_3C(=O)CHClCHFCF_3$, $CF_3C(=O)CH(CF_3)CHFCl$, $CF_3C(=O)CH(CF_3)CH_2F$, $CF_3C(=O)CF(CF_3)CH_2F$, $CF_3C(=O)CH(CF_3)CHF_2$, $CF_3C(=O)CHFCF_3$, $CF_3C(=O)CClFCF_3$, $CF_3C(=O)CBrFCF_3$, $CF_3CF_2C(=O)CF_2CF_3$, $CF_3CF_2C(=O)CF(CF_3)_2$, $CF_3CF_2C(=O)CF_2CF(CF_3)_2$, $CF_3CF_2C(=O)CF(CF_2CF_3)_2$, $CF_3CF_2C(=O)CF(CF_2CF_3)_2$, $CF_3CF_2C(=O)CF(CF_2CF_3)CF_2CF_2CF_3$, $CF_3CF_2C(=O)CF_2CF_2CF=CF_2$, $CF_3CF_2C(=O)CF(CF_3)CF=CF_2$, $CF_3CF_2C(=O)CH(CF_3)CHFCF_3$, $CF_3CF_2C(=O)CH_2CFBrCF_3$, $CF_3CF_2C(=O)CBr(CF_3)CH_2F$, $CF_3CF_2C(=O)CHBrCHFCF_3$, $CF_3CF_2C(=O)CCl(CF_3)CH_2F$, $CF_3CF_2C(=O)CHClCHFCF_3$, $CF_3CF_2C(=O)CH(CF_3)CHFCl$, $CF_3CF_2C(=O)CH(CF_3)CH_2F$, $CF_3CF_2C(=O)CF(CF_3)CH_2F$, $CF_3CF_2C(=O)CH(CF_3)CHF_2$, $CF_3CF_2C(=O)CHFCF_3$, $CF_3CF_2C(=O)CClFCF_3$, $CF_3CF_2C(=O)CBrFCF_3$, $CF_3CF_2CF_2C(=O)CF(CF_3)_2$, $CF_3CF_2CF_2C(=O)CF_2CF(CF_3)_2$, $CF_3CF_2CF_2C(=O)CF(CF_2CF_3)_2$, $CF_3CF_2CF_2C(=O)CF(CF_2CF_3)CF_2CF_2CF_3$, $CF_3CF_2CF_2C(=O)CF_2CF_2CF=CF_2$, $CF_3CF_2CF_2C(=O)CF(CF_3)CF=CF_2$, $CF_3CF_2CF_2C(=O)CH(CF_3)CHFCF_3$, $CF_3CF_2CF_2C(=O)CH_2CFBrCF_3$, $CF_3CF_2CF_2C(=O)CBr(CF_3)CH_2F$, $CF_3CF_2CF_2C(=O)CHBrCHFCF_3$, $CF_3CF_2CF_2C(=O)CCl(CF_3)CH_2F$, $CF_3CF_2CF_2C(=O)CHClCHFCF_3$, $CF_3CF_2CF_2C(=O)CH(CF_3)CHFCl$, $CF_3CF_2CF_2C(=O)CH(CF_3)CH_2F$, $CF_3CF_2CF_2C(=O)CF(CF_3)CH_2F$, $CF_3CF_2CF_2C(=O)CH(CF_3)CHF_2$, $CF_3CF_2CF_2C(=O)CHFCF_3$, $CF_3CF_2CF_2C(=O)CClFCF_3$, $CF_3CF_2CF_2C(=O)CBrFCF_3$, $(CF_3)_2CFC(=O)CF(CF_3)_2$, $(CF_3)_2CFC(=O)CF_2CF(CF_3)_2$, $(CF_3)_2CFC(=O)CF(CF_2CF_3)_2$, $(CF_3)_2CFC(=O)CF(CF_2CF_3)CF_2CF_2CF_3$, $(CF_3)_2CFC(=O)CF_2CF_2CF=CF_2$, $(CF_3)_2CFC(=O)CF(CF_3)CF=CF_2$, $(CF_3)_2CFC(=O)CH(CF_3)CHFCF_3$, $(CF_3)_2CFC(=O)CH_2CFBrCF_3$, $(CF_3)_2CFC(=O)CBr(CF_3)CH_2F$, $(CF_3)_2CFC(=O)CHBrCHFCF_3$, $(CF_3)_2CFC(=O)CCl(CF_3)CH_2F$, $(CF_3)_2CFC(=O)CHClCHFCF_3$, $(CF_3)_2CFC(=O)CH(CF_3)CHFCl$, $(CF_3)_2CFC(=O)CH(CF_3)CH_2F$, $(CF_3)_2CFC(=O)CF(CF_3)CH_2F$, $(CF_3)_2CFC(=O)CH(CF_3)CHF_2$, $(CF_3)_2CFC(=O)CHFCF_3$, $(CF_3)_2CFC(=O)CClFCF_3$, $(CF_3)_2CFC(=O)CBrFCF_3$.

6. The composition according to claim 5, wherein the fluorine-containing ketone is at least one selected from the group consisting of the following compounds:
$CF_3C(=O)CF_3$, $CF_3C(=O)CF_2CF_3$, $CF_3C(=O)CF(CF_3)_2$, $CF_3C(=O)CF_2CF(CF_3)_2$, $CF_3C(=O)CF(CF_3)CF=CF_2$, $CF_3C(=O)CH(CF_3)CHFCF_3$, $CF_3C(=O)CH_2CFBrCF_3$, $CF_3C(=O)CBr(CF_3)CH_2F$, $CF_3C(=O)CHBrCHFCF_3$, $CF_3C(=O)CCl(CF_3)CH_2F$, $CF_3C(=O)CH(CF_3)CHFCl$, $CF_3C(=O)CHFCF_3$, $CF_3C(=O)CClFCF_3$, $CF_3C(=O)CBrFCF_3$, $CF_3CF_2C(=O)CF_2CF_3$, $CF_3CF_2C(=O)CF(CF_3)_2$, $CF_3CF_2C(=O)CF(CF_3)CF=CF_2$, $CF_3CF_2C(=O)CH(CF_3)CHFCF_3$, $CF_3CF_2C(=O)CH_2CFBrCF_3$, $CF_3CF_2C(=O)CBr(CF_3)CH_2F$, $CF_3CF_2C(=O)CHBrCHFCF_3$, $CF_3CF_2C(=O)CCl(CF_3)CH_2F$, $CF_3CF_2C(=O)CH(CF_3)CHFCl$, $CF_3CF_2C(=O)CHFCF_3$, $CF_3CF_2C(=O)CClFCF_3$, $CF_3CF_2C(=O)CBrFCF_3$, $CF_3CF_2CF_2C(=O)CF(CF_3)_2$, $CF_3CF_2CF_2C(=O)CF_2CF(CF_3)_2$, $CF_3CF_2CF_2C(=O)CF(CF_3)CF=CF_2$, $CF_3CF_2CF_2C(=O)CH(CF_3)CHFCF_3$, $CF_3CF_2CF_2C(=O)CH_2CFBrCF_3$, $CF_3CF_2CF_2C(=O)CBr(CF_3)CH_2F$, $CF_3CF_2CF_2C(=O)CHBrCHFCF_3$, $CF_3CF_2CF_2C(=O)CCl(CF_3)CH_2F$, $CF_3CF_2CF_2C(=O)CH(CF_3)CHFCl$, $CF_3CF_2CF_2C(=O)CHFCF_3$, $CF_3CF_2CF_2C(=O)CClFCF_3$, $CF_3CF_2CF_2C(=O)CBrFCF_3$, $(CF_3)_2CFC(=O)CF(CF_3)_2$, $(CF_3)_2CFC(=O)CF_2CF(CF_3)_2$, $(CF_3)_2CFC(=O)CF(CF_3)CF=CF_2$, $(CF_3)_2CFC(=O)CH(CF_3)CHFCF_3$, $(CF_3)_2CFC(=O)CH_2CFBrCF_3$, $(CF_3)_2CFC(=O)CBr(CF_3)CH_2F$, $(CF_3)_2CFC(=O)CHBrCHFCF_3$, $(CF_3)_2CFC(=O)CCl(CF_3)CH_2F$, $(CF_3)_2CFC(=O)CH(CF_3)CHFCl$, $(CF_3)_2CFC(=O)CHFCF_3$, $(CF_3)_2CFC(=O)CClFCF_3$, $(CF_3)_2CFC(=O)CBrFCF_3$.

7. The composition according to claim 6, wherein the fluorine-containing ketone is at least one selected from the group consisting of the following compounds:
$CF_3C(=O)CF_3$, $CF_3C(=O)CF_2CF_3$, $CF_3C(=O)CF(CF_3)_2$, $CF_3C(=O)CF_2CF(CF_3)_2$, $CF_3C(=O)CBr(CF_3)CH_2F$, $CF_3C(=O)CBrFCF_3$, $CF_3CF_2C(=O)CF_2CF_3$, $CF_3CF_2C(=O)CF(CF_3)_2$, $CF_3CF_2C(=O)CBr(CF_3)CH_2F$, $CF_3CF_2C(=O)CBrFCF_3$, $CF_3CF_2CF_2C(=O)CF(CF_3)_2$, $CF_3CF_2CF_2C(=O)CF_2CF(CF_3)_2$, $CF_3CF_2CF_2C(=O)CBr(CF_3)CH_2F$, $CF_3CF_2CF_2C(=O)CBrFCF_3$, $(CF_3)_2CFC(=O)CF(CF_3)_2$, $(CF_3)_2CFC(=O)CF_2CF(CF_3)_2$, $(CF_3)_2CFC(=O)CBr(CF_3)CH_2F$, $(CF_3)_2CFC(=O)CBrFCF_3$.

8. The composition according to claim 7, wherein the fluorine-containing ketone is at least one of $CF_3C(=O)CF(CF_3)CF_3$, $CF_3CF_2CF_2C(=O)CF(CF_3)_2$, $CF_3CF_2CF_2C(=O)CF(CF_3)CF_3$ or $(CF_3)_2CFC(=O)CF(CF_3)_2$.

9. The composition according to claim 1, wherein:
the epoxy compound is at least one selected from the group consisting of epoxyethane, 1,2-epoxypropane, 1,2-epoxybutane, 1,2-epoxycyclopentane, 1,2-epoxycyclohexane, 1,2-epoxyisobutane, 1,2-epoxyethylbenzene, 4-vinyl-1-cyclohexene diepoxide and 1-tert-butoxy-2,3-epoxypropane;
the β-diketone compound is at least one selected from the group consisting of dibenzoylmethane and stearoylbenzoylmethane;
the salicylate compound is at least one selected from the group consisting of methyl salicylate, ethyl salicylate, butyl salicylate, isooctyl salicylate, 4-tert-butylphenyl salicylate and phenyl salicylate;
the cinnamate compound is at least one selected from the group consisting of ethyl 3-diphenylacrylate, benzyl 3-phenylacrylate, ethyl 2-cyano-3,3-diphenylacrylate and 2-ethylhexyl 2-cyano-3,3-diphenylacrylate;
the hydroxybenzophenone compound is at least one selected from the group consisting of 2,4-dihydroxybenzophenone, 2-hydroxy-4-methoxybenzophenone, 2,2'-dihydroxy-methoxybenzophenone, 2,2',4,4'-tetrahydroxybenzophenone, 2,2'-dihydroxy-4,4'-dimethoxybenzophenone and 2-hydroxy-4-(octyloxy)benzophenone;
the hydroxybenzoic acid compound is at least one selected from the group consisting of 2,4-di-tert-butylphenyl 3,5-di-tert-butyl-4-hydroxybenzoate and n-hexadecyl 3,5-di-tert-butyl-4-hydroxybenzoate;
the alkoxymethane compound is at least one selected from the group consisting of trimethoxymethane, triethoxymethane, tri-n-propoxymethane, tri-n-butoxymethane, tripentyloxymethane, trimethoxy phenylmethane, diethoxy benzyloxymethane, diethoxy alkenyloxymethane and tris-(chloroethoxy)methane;
the organic thio compound is at least one selected from the group consisting of dilauryl 3,3'-thiodipropionate, dioctadecyl 3,3'-thiodipropionate and dimyristyl 3,3'-thiodipropionate.

10. The composition according to claim 9, wherein:
the epoxy compound is at least one selected from the group consisting of 1,2-epoxypropane, 1,2-epoxycyclopentane, 1,2-epoxycyclohexane, 1,2-epoxyisobutane and 1,2-epoxyethylbenzene;
the β-diketone compound is dibenzoylmethane;
the salicylate compound is at least one of methyl salicylate, butyl salicylate, isooctyl salicylate or phenyl salicylate;
the cinnamate compound is at least one of ethyl 3-diphenylacrylate, benzyl 3-phenylacrylate or ethyl 2-cyano-3,3-diphenylacrylate;
the hydroxybenzophenone compound is at least one selected from the group consisting of 2,4-dihydroxybenzophenone, 2-hydroxy-4-methoxybenzophenone, 2,2',4,4'-tetrahydroxybenzophenone and 2,2'-dihydroxy-4,4'-dimethoxybenzophenone;
the hydroxybenzoic acid compound is n-hexadecyl 3,5-di-tert-butyl-4-hydroxybenzoate;
the alkoxymethane compound is at least one selected from the group consisting of trimethoxymethane, triethoxymethane, tri-n-propoxymethane, tri-n-butoxymethane, trimethoxy phenylmethane and tris-(chloroethoxy)methane;
the organic thio compound is dilauryl 3,3'-thiodipropionate.

11. The composition according to claim 10, wherein:
the epoxy compound is at least one selected from the group consisting of 1,2-epoxypropane, 1,2-epoxycyclohexane, and 1,2-epoxyethylbenzene;
the β-diketone compound is dibenzoylmethane;
the salicylate compound is at least one of methyl salicylate or phenyl salicylate;
the cinnamate compound is at least one of benzyl 3-phenylacrylate or ethyl 2-cyano-3,3-diphenylacrylate;
the hydroxybenzophenone compound is at least one selected from the group consisting of 2-hydroxy-4-methoxybenzophenone and 2,2'-dihydroxy-4,4'-dimethoxybenzophenone;
the hydroxybenzoic acid compound is n-hexadecyl 3,5-di-tert-butyl-4-hydroxybenzoate;
the alkoxymethane compound is at least one selected from the group consisting of trimethoxymethane, triethoxymethane, tri-n-propoxymethane, tri-n-butoxymethane, trimethoxy phenylmethane and tris-(chloroethoxy)methane;

the organic thio compound is dilauryl 3,3'-thiodipropionate.

12. The composition according to claim 1, wherein the mass ratio of the stabilizer to the fluorine-containing ketone ranges from 0.5:1000 to 10:1000.

13. The composition according to claim 1, wherein the mass ratio of the stabilizer to the fluorine-containing ketone ranges from 0.5:1000 to 5:1000.

14. The composition of claim 1, wherein the composition is used as an extinguishing agent, heat transfer medium, magnesium alloy melt protective agent, solvent, cleaning agent, blowing agent, aerosol propellant, insulating medium or electron etching gas.

15. The composition of claim 1, wherein the composition is used as a fire extinguishing agent in a pipe network fire extinguishing system, a cabinet fire extinguishing system, a hanging fire extinguishing system, a fire detection tube fire extinguishing system or a portable fire extinguisher; or the composition is used as a heat transfer medium in a refrigerator, a cooler, an organic rankine cycle device, a heat pump, or a container; or the composition is used as an insulating medium or an arc extinguishing medium in medium voltage, high voltage, extra high voltage power electrical equipment.

* * * * *